US011402608B2

(12) United States Patent
Nomura

(10) Patent No.: US 11,402,608 B2
(45) Date of Patent: Aug. 2, 2022

(54) IMAGING LENS SYSTEM

(71) Applicant: Ricoh Company, Ltd., Tokyo (JP)

(72) Inventor: Yoichi Nomura, Tokyo (JP)

(73) Assignee: RICOH COMPANY, LTD., Tokyo (JP)

(*) Notice: Subject to any disclaimer, the term of this patent is extended or adjusted under 35 U.S.C. 154(b) by 3 days.

(21) Appl. No.: 16/798,533

(22) Filed: Feb. 24, 2020

(65) Prior Publication Data

US 2020/0301101 A1 Sep. 24, 2020

(30) Foreign Application Priority Data

Mar. 19, 2019 (JP) ............................. JP2019-050685

(51) Int. Cl.
  *G02B 9/06* (2006.01)
  *G02B 9/60* (2006.01)
  *H04N 5/225* (2006.01)
(52) U.S. Cl.
  CPC ................. *G02B 9/06* (2013.01); *G02B 9/60* (2013.01); *H04N 5/2254* (2013.01)
(58) Field of Classification Search
  CPC .......... G02B 9/06; G02B 9/60; G02B 27/646; G02B 13/02; G02B 9/04; G02B 9/12; G02B 13/00; G02B 13/009; G02B 13/04; G02B 15/144; G02B 15/1441; G02B 15/144115; G02B 9/08; G02B 9/14; G02B 9/16; G02B 9/34; G02B 9/62; G02B 9/64; H04N 5/2254; G03B 2205/0007
  USPC ................. 359/745, 748, 749, 753, 793–794, 359/784–788
  See application file for complete search history.

(56) References Cited

U.S. PATENT DOCUMENTS

| 2014/0211082 | A1* | 7/2014 | Imaoka ............ G02B 15/1465 348/373 |
| 2016/0266350 | A1* | 9/2016 | Iiyama ..................... G02B 9/64 |
| 2017/0336600 | A1* | 11/2017 | Segawa ................ G02B 13/009 |
| 2018/0196223 | A1* | 7/2018 | Umeda ................ G02B 15/177 |
| 2018/0348478 | A1* | 12/2018 | Mori ........................ G02B 9/60 |
| 2019/0025559 | A1* | 1/2019 | Tanaka .................. G02B 15/16 |

(Continued)

FOREIGN PATENT DOCUMENTS

| JP | 2011-107450 | 6/2011 |
| JP | 2013-007856 | 1/2013 |
| JP | 2015-152812 | 8/2015 |

(Continued)

*Primary Examiner* — Marin Pichler
*Assistant Examiner* — Alberto J Betancourt
(74) *Attorney, Agent, or Firm* — Xsensus LLP

(57) ABSTRACT

An imaging lens system includes sequentially from an object side, a first lens group and a second lens group. The second lens group includes a focus lens group configured to move during focusing or the first lens group and the second lens group are divided at a position of a maximum air gap. Conditional Expressions (1) and (2) are satisfied as follows:

$$-2.0 < fL1/f < -0.95, \text{ and} \quad (1)$$

$$1.7 < NdP1Gmin\_vd/L1\_vd < 2.5, \quad (2)$$

where
fL1 is a focal length of a lens located closest to the object side of the first lens group,
f is a focal length of a whole system,
NdP1Gmin_vd is an Abbe number for a d-line of a positive lens having a smallest refractive index of the first lens group, and
L1_vd is an Abbe number for the d-line of the lens located closest to the object side of the first lens group.

20 Claims, 17 Drawing Sheets

(56) References Cited

U.S. PATENT DOCUMENTS

2021/0011256 A1* 1/2021 Muratani ............... G02B 13/04

FOREIGN PATENT DOCUMENTS

| | | |
|---|---|---|
| JP | 2016-012034 | 1/2016 |
| JP | 2016-151661 | 8/2016 |
| JP | 2018-005099 | 1/2018 |

* cited by examiner

IMAGING LENS SYSTEM

CROSS-REFERENCE TO RELATED APPLICATIONS

This patent application is based on and claims priority pursuant to 35 U.S.C. § 119(a) to Japanese Patent Application No. 2019-050685, filed on Mar. 19, 2019, in the Japan Patent Office, the entire disclosure of which is incorporated by reference herein.

BACKGROUND

Technical Field

The present disclosure relates to an imaging lens system (single-focus lens system), for example, a large-diameter medium telephoto lens system optimal for an imaging apparatus such as a digital camera.

Description of the Related Art

There is a demand for a digital single-lens reflex camera to have an optical system with high resolution over the whole imaging-distance range and high flatness of an image as the number of pixels increases in an imaging element. Moreover, performance of a large-diameter lens with a small F-number is enhanced to obtain an image using blurring in front and rear of a portion in focus.

To respond to the demands, chromatic aberration and field curvature are required to be decreased. Chromatic aberration in recent years can be corrected by post processing of image processing performed in the camera or performed by software of a personal computer through image processing; however, to obtain optical performance with higher resolution, it is required to sufficiently reduce chromatic aberration of the optical system. Field curvature is aberration that is not corrected by the post processing of the image processing.

In particular, for a medium telephoto lens system including a large-diameter lens with a small F-number and having a slightly long focal length, high optical performance may not be obtained over the whole screen unless aberrations, such as chromatic aberration, spherical aberration, and field curvature, are properly corrected.

BRIEF SUMMARY

There is provided an improved imaging lens system including sequentially from an object side, a first lens group having a positive refractive power, and a second lens group having a positive refractive power. The imaging lens system has at least one of a configuration that the second lens group includes a focus lens group configured to move during focusing and a configuration that the first lens group and the second lens group are divided at a position of a maximum air gap. Conditional Expressions (1) and (2) are satisfied as follows:

$$-2.0 < fL1/f < -0.95, \text{ and} \quad (1)$$

$$1.7 < NdP1Gmin\_vd/L1\_vd < 2.5, \quad (2)$$

where
fL1 is a focal length of a lens located closest to the object side of the first lens group,
f is a focal length of a whole system,
NdP1Gmin_vd is an Abbe number for a d-line of a positive lens having a smallest refractive index of the first lens group, and
L1_vd is an Abbe number for the d-line of the lens located closest to the object side of the first lens group.

BRIEF DESCRIPTION OF THE DRAWINGS

The aforementioned and other aspects, features, and advantages of the present disclosure would be better understood by reference to the following detailed description when considered in connection with the accompanying drawings, wherein.

Figure 1:
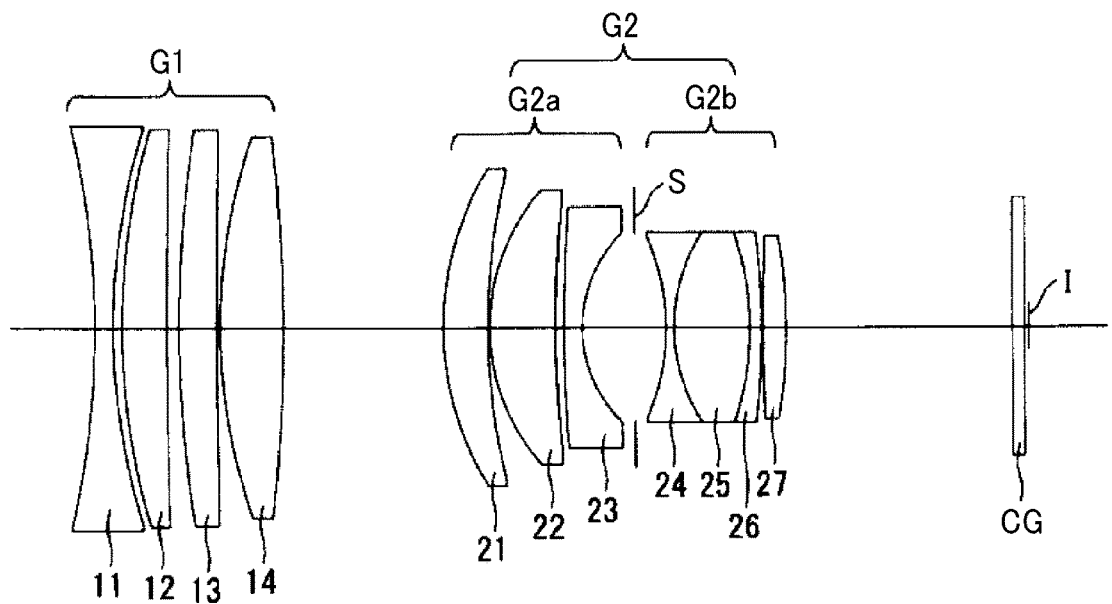
FIG. 1 is a lens configuration diagram of an imaging lens system in focus on an object at infinity according to Numerical Example 1.

The accompanying drawings are intended to depict embodiments of the present disclosure and should not be interpreted to limit the scope thereof. The accompanying drawings are not to be considered as drawn to scale unless explicitly noted.

DETAILED DESCRIPTION OF EMBODIMENTS

In describing embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner and achieve similar results.

Although the embodiments are described with technical limitations with reference to the attached drawings, such description is not intended to limit the scope of the disclosure and all of the components or elements described in the embodiments of this disclosure are not necessarily indispensable.

Referring now to the drawings, embodiments of the present disclosure are described below. In the drawings for explaining the following embodiments, the same reference codes are allocated to elements (members or components) having the same function or shape and redundant descriptions thereof are omitted below.

An imaging lens system according to an embodiment includes, sequentially from an object side, a first lens group having a positive refractive power, and a second lens group having a positive refractive power, in which the imaging lens system has at least one of a configuration that the second lens group includes a focus lens group configured to move during focusing and a configuration that the first lens group and the second lens group are divided at a position of a maximum air gap, and in which Conditional Expressions (1) and (2) are satisfied as follows:

$$-2.0 < fL1/f < -0.95, \text{ and} \qquad (1)$$

$$1.7 < NdP1Gmin\_vd/L1\_vd < 2.5, \qquad (2)$$

where
fL1 is a focal length of a lens located closest to the object side of the first lens group,
f is a focal length of a whole system,
NdP1Gmin_vd is an Abbe number for a d-line of a positive lens having a smallest refractive index of the first lens group, and
L1_vd is an Abbe number for the d-line of the lens located closest to the object side of the first lens group.

The imaging lens system according to the embodiment can satisfy Conditional Expression (3) as follows:

$$-1.5 < (L1R2+L1R1)/(L1R2-L1R1) < 0.5, \qquad (3)$$

where
L1R1 is a curvature radius of a surface on the object side of the lens located closest to the object side of the first lens group, and
L1R2 is a curvature radius of a surface on an image side of the lens located closest to the object side of the first lens group.

Within the range of Conditional Expression (3), in particular, Conditional Expression (3') is desirably satisfied as follows:

$$-1.3 < (L1R2+L1R1)/(L1R2-L1R1) < 0.5. \qquad (3')$$

Within the range of Conditional Expression (3), in particular, Conditional Expression (3") is desirably satisfied as follows:

$$-0.5 < (L1R2+L1R1)/(L1R2-L1R1) < 0.5. \qquad (3")$$

The imaging lens system according to the embodiment can satisfy Conditional Expression (4) as follows:

$$0.32 < f2Gp/f1Gp < 0.50, \qquad (4)$$

where
f1Gp is a focal length of the first lens group, and
f2Gp is a focal length of the second lens group.

The first lens group may include a negative lens located closest to the object side, and can satisfy Conditional Expression (5) as follows:

$$0.01 < LnR2/LpR1 < 1.2, \qquad (5)$$

where
LnR2 is a curvature radius of a surface on an image side of the negative lens located closest to the object side of the first lens group, and
LpR1 is a curvature radius of a surface on the object side of a lens located in immediately rear of the negative lens located closest to the object side of the first lens group.

Within the range of Conditional Expression (5), in particular, Conditional Expression (5') is desirably satisfied as follows:

$$0.3 < LnR2/LpR1 < 1.2. \qquad (5')$$

The first lens group may include a negative lens located closest to the object side and having a concave surface facing the object side, and at least three positive lenses located closer than the negative lens to an image side.

The first lens group may include one of a subgroup including four lenses including, sequentially from the object side, a negative lens, a positive lens, a positive lens, and a positive lens, and a subgroup including five lenses including, sequentially from the object side, a negative lens, a positive lens, a negative lens, a positive lens, and a positive lens.

The imaging lens system according to the embodiment can satisfy Conditional Expression (6) as follows:

$$1.25 < Nd\_1GpPmax/Nd\_1GpPmin, \qquad (6)$$

where
Nd_1GpPmax is a refractive index of a positive lens having a largest refractive index of the first lens group, and Nd_1GpPmin is a refractive index of a positive lens having a smallest refractive index of the first lens group.

The second lens group may include, sequentially from the object side, a second-a lens subgroup having a positive refractive power, an aperture stop, and a second-b lens subgroup having a positive refractive power; a lens surface located closest to an image side of the second-a lens subgroup may have a concave surface facing the image side; and a lens surface located closest to the object side of the second-b lens subgroup may have a concave surface facing the object side.

The imaging lens system according to the embodiment can satisfy Conditional Expression (7) as follows:

$$1.80 < Nd\_2BGpPave, \quad (7)$$

where
Nd_2BGpPave is an average value of refractive indices of a plurality of positive lenses of the second-b lens subgroup.

The second-b lens subgroup may have at least one aspherical surface.

The second-a lens subgroup may include three lenses including, sequentially from the object side, a positive lens, a positive lens, and a negative lens, and the second-b lens subgroup may include one of a subgroup including four lenses including, sequentially from the object side, a negative lens, a positive lens, a negative lens, and a positive lens, and a subgroup including five lenses including, sequentially from the object side, a negative lens, a positive lens, a negative lens, a positive lens, and a positive lens.

The imaging lens system according to the embodiment can satisfy Conditional Expression (8) as follows:

$$0.13 < DG1\text{-}G2/TL < 0.18, \quad (8)$$

where
DG1-G2 is a distance between a surface located closest to an image side of the first lens group and a surface located closest to the object side of the second lens group, and
TL is a distance between a surface located closest to the object side of the first lens group and an image surface.

The first lens group may be fixed relative to an image surface and the second lens group may move toward the object side during focusing.

The first lens group and the second lens group may move toward the object side by different moving amounts during focusing.

The first lens group may move toward an image side and the second lens group may move toward the object side during focusing.

The second lens group may include an image-blur correction lens group configured to move in a direction containing a component orthogonal to an optical axis and displace an imaging position to correct an image blur.

An imaging lens system (single-focus lens system) according to an embodiment includes, sequentially from an object side, a first lens group G1 having a positive refractive power, and a second lens group G2 having a positive refractive power. A cover glass CG is provided between the second lens group G2 and an image surface 1 (at a position immediately front of the image surface I). The cover glass CG may function as an optical filter.

The first lens group G1 and the second lens group G2 are divided according to at least one of references (X) and (Y) (in other words, a boundary between lens groups is determined).

(X) The second lens group G2 includes a focus lens group configured to move during focusing, and the first lens group G1 and the second lens group G2 are divided in this point.

More specifically, the second lens group G2 moves from an image side to an object side during focusing when an object distance changes from infinity to close-up. Focusing operations including behaviors of the first lens group G1 include (X-1), (X-2), and (X-3) as follows.

(X-1) A focusing operation is "rear focus" in which the first lens group G1 is fixed relative to the image surface I and the second lens group G2 moves toward the object side during focusing.

(X-2) Another focusing operation is "floating focus" in which the first lens group G1 and the second lens group G2 move toward the object side by different moving amounts during focusing. In this case, the moving amounts of the first lens group G1 and the second lens group G2 are freely determined (any one of the moving amounts may be larger or smaller than the other one).

(X-3) Still another focusing operation is another "floating focus" in which the first lens group G1 moves toward the image side and the second lens group G2 moves toward the object side during focusing. In this case, the moving amounts of the first lens group G1 and the second lens group G2 are freely determined (any one of the moving amounts may be larger or smaller than the other one, and the moving amounts may be the same). The first lens group G1 moves toward the image side during focusing to obtain an effect of correcting field curvature.

(Y) The first lens group G1 and the second lens group G2 are divided at a position of the maximum air gap.

The first lens group G1 includes four lenses including, sequentially from the object side, a negative lens 11, a positive lens 12, a positive lens 13, and a positive lens 14 in Numerical Examples 1 to 10.

The first lens group G1 includes five lenses including, sequentially from the object side, a negative lens 11', a positive lens 12', a negative lens 13', a positive lens 14', and a positive lens 15' in Numerical Example 11.

The negative lens (11 or 11') located closest to the object side of the first lens group G1 has a concave surface facing the object side.

The first lens group G1 may include a negative lens (11 or 11') located closest to the object side and having a concave surface facing the object side, and at least three positive lenses (a set of a positive lens 12, a positive lens 13, and a positive lens 14, or a set of a positive lens 12', a positive lens 14', and a positive lens 15') located closer than the negative lens (11 or 11') to the image side.

The second lens group G2 includes, sequentially from the object side, a second-a lens subgroup G2a having a positive refractive power, an aperture stop S, and a second-b lens subgroup G2b having a positive refractive power.

The second-a lens subgroup G2a includes three lenses including, sequentially from the object side, a positive lens 21, a positive lens 22, and a negative lens 23 throughout Numerical Examples 1 to 11.

The second-b lens subgroup G2b includes four lenses including, sequentially from the object side, a negative lens 24, a positive lens 25, a negative lens 26, and a positive lens 27 in Numerical Examples 1, 2, 8, and 11.

The second-b lens subgroup G2b includes five lenses including, sequentially from the object side, a negative lens 24', a positive lens 25', a negative lens 26', a positive lens 27', and a positive lens 28' in Numerical Examples 3 to 7, 9, and 10.

The positive lens (27 or 28') located closest to the image side of the second-b lens subgroup G2b has aspherical surfaces on both sides. An aspherical surface may be formed on one of surfaces of the positive lens (27 or 28') located closest to the image side of the second-b lens subgroup G2b. Alternatively, an aspherical surface may be formed on another lens of the second-b lens subgroup G2b. That is, the second-b lens subgroup G2b may have, as a whole, at least one aspherical surface.

A lens surface located closest to the image side of the second-a lens subgroup G2a (a surface on the image side of the negative lens 23) has a concave surface facing the image side. A lens surface located closest to the object side of the second-b lens subgroup G2b (a surface on the object side of the negative lens 24 or the negative lens 24') has a concave surface facing the object side. A biconvex air lens is formed between both the lens surfaces, defining a double-Gauss system configuration. The double-Gauss system configuration is frequently used for a large-diameter lens system.

The second lens group G2 may include an image-blur correction lens group configured to move in a direction containing a component orthogonal to the optical axis and displace the imaging position to correct an image blur (at least one lens of the second lens group G2 may constitute an image-blur correction lens group).

The imaging lens system (single-focus lens system) according to the embodiment is a large-diameter medium telephoto lens. The imaging lens system can properly correct aberrations, such as spherical aberration, coma aberration, and astigmatism, in the whole imaging-distance range, and can properly correct particularly chromatic aberration. Moreover, the imaging lens system can correct field curvature in a well-balanced manner and can attain excellent optical performance with high flatness of an image.

The negative lens (11 or 11') having a concave surface facing the object side is located closest to the object side of the first lens group G1. To correct chromatic aberration, the positive lenses (a set of 12, 13, and 14, or a set of 12', 14' and 15') subsequent to the negative lens (11 or 11') in the first lens group G1 are made of a glass member having a relatively large Abbe number.

A low-dispersion glass member having an Abbe number of 70 or more typically has a positive anomalous dispersion, thereby properly correcting axial chromatic aberration. However, the low-dispersion glass member has a low refractive index of about 1.4 to about 1.5. A lens surface (refractive surface) has to have a stronger curvature to obtain a desirable refractive power. Consequently, spherical aberration and field curvature likely occur.

To obtain high optical performance over the whole screen, it is required to appropriately select a glass member to properly correct chromatic aberration and in addition other aberrations, such as spherical aberration and field curvature. Thus, positive lenses in the optical system require a glass member having a positive anomalous dispersion and a glass member having a high refractive index disposed in a well-balanced manner.

The first lens group G1 includes three or more positive lenses including a positive lens having a high refractive power and a positive lens having an anomalous dispersion and a low refractive index like the embodiment to properly correct aberrations, such as chromatic aberration, spherical aberration, and field curvature.

The second-a lens subgroup G2a includes the three lenses including, sequentially from the object side, the positive lens 21, the positive lens 22, and the negative lens 23. The positive lenses of the second-a lens subgroup G2a include a low-dispersion glass member having an Abbe number of 70 or more to correct axial chromatic aberration.

For the positive lenses of the second-b lens subgroup G2b, positive lenses having an average refractive index of 1.8 or more are used to correct field curvature in the whole imaging-distance range.

In addition, the second-b lens subgroup G2b includes at least one aspherical surface to reduce aberrations, such as spherical aberration and astigmatism. In a case without an aspherical surface, correcting astigmatism (astigmatic difference) leads to occurrence of field curvature in the whole screen range, and flatness of an image may not be kept.

Conditional Expression (1) determines a ratio of a focal length of a lens (11 or 11') located closest to the object side of the first lens group G1 to a focal length of the whole system. Conditional Expression (1) is satisfied to properly correct aberrations, such as distortion, lateral chromatic aberration, axial chromatic aberration, and field curvature, thereby obtaining excellent optical performance and decreasing the lens total length.

If the value is above the upper limit of Conditional Expression (1), the refractive power (power) of the negative lens (11 or 11') located closest to the object side of the first lens group G1 excessively increases, leading to generation of significant negative distortion which may not be corrected. When the refractive power of a surface excessively increases, lateral chromatic aberration increases, and correction of aberrations in the whole optical system may not be balanced. Moreover, the lens total length increases.

If the value is below the lower limit of Conditional Expression (1), the refractive power (power) of the negative lens (11 or 11') located closest to the object side of the first lens group G1 excessively decreases, and axial chromatic aberration may not be properly corrected. Moreover, since the negative refractive power decreases, the Petzval sum may not be properly corrected. Thus, correction on field curvature deteriorates.

Conditional Expression (2) determines a ratio of an Abbe number for the d-line of the positive lens (12 or 14, or 14' or 15') having the smallest refractive index of the first lens group G1 to an Abbe number for the d-line of the lens (11 or 11') located closest to the object side of the first lens group G1. Conditional Expression (2) is satisfied to properly correct chromatic aberration and to obtain excellent optical performance.

If the value is above the upper limit of Conditional Expression (2), the negative anomalous dispersion of the lens (11 or 11') located closest to the object side of the first lens group G1 decreases, and chromatic aberration may not be corrected.

If the value is below the lower limit of Conditional Expression (2), the positive anomalous dispersion of the positive lens of the first lens group G1 decreases, and chromatic aberration may not be corrected.

Conditional Expressions (3), (3'), and (3") each determine a shape (shaping factor) of the lens (11 or 11') located closest to the object side of the first lens group G1. Even when the refractive power of the lens (11 or 11') located closest to the object side of the first lens group G1 is not changed, the shape of the lens is to be considered to appropriately balance aberrations relating to flatness of an image, such as field curvature and astigmatism, and other aberrations, such as spherical aberration and coma aberration. Conditional Expression (3) is satisfied to properly correct aberrations, such as spherical aberration, coma aberration, astigmatism, and distortion. Moreover, aberrations relating to flatness of an image, such as field curvature and astigmatism, and other aberrations, such as spherical aberration and coma aberration, can be appropriately balanced. The advantageous effects are more markedly exhibited when Conditional Expression (3') is satisfied, and are further markedly exhibited when Conditional Expression (3") is satisfied.

If the value is above the upper limit of Conditional Expressions (3), (3'), and (3"), the negative refractive power of the surface on the image side of the lens (11 or 11') located closest to the object side of the first lens group G1 excessively decreases, and aberrations, such as spherical aberration, coma aberration, and astigmatism, may not be corrected.

If the value is below the lower limit of Conditional Expression (3), the negative refractive power of the surface on the image side of the lens (11 or 11') located closest to the object side of the first lens group G1 excessively increases, increasing negative distortion. Moreover, aberrations relating to flatness of an image, such as field curvature and astigmatism, and other aberrations, such as spherical aberration and coma aberration, may not be balanced.

Conditional Expression (4) determines a ratio of a focal length of the first lens group G1 to a focal length of the second lens group G2. Conditional Expression (4) is to make the imaging lens system according to the embodiment suitable to, for example, an interchangeable lens (a digital single-lens reflex camera demanded to ensure a backfocus). Conditional Expression (4) is satisfied to ensure a relatively long backfocus and to properly correct aberrations, such as spherical aberration, coma aberration, and astigmatism. Moreover, the whole system is not increased in size while its F-number is kept, and the speed of focusing by the second lens group G2 can be increased.

If the value is above the upper limit of Conditional Expression (4), the refractive power (power) of the first lens group G1 excessively increases, and aberrations, such as spherical aberration, coma aberration, and astigmatism, may not be corrected. In addition, the backfocus may not be ensured.

If the value is below the lower limit of Conditional Expression (4), the refractive power (power) of the second lens group G2 excessively decreases. To keep the F-number of the whole system, the diameters of the lenses included in the second lens group G2 and the aperture stop are required to be increased, leading to an increase in size. Moreover, since the diameters increase, the weight of the lenses increases, which is disadvantageous to increase the speed of focusing by the second lens group G2.

As described above, the first lens group G1 includes the negative lens (11 or 11') located closest to the object side. Conditional Expressions (5) and (5') each determine a relationship between a curvature radius of a surface on the image side of the negative lens (11 or 11') located closest to the object side of the first lens group G1 and a curvature radius of a surface on the object side of a lens (12 or 12') located in immediately rear of the negative lens (11 or 11') located closest to the object side of the first lens group G1 (in other words, a shape (shaping factor) of an air lens formed between both the lenses). Conditional Expression (5) is satisfied to properly correct aberrations, such as spherical aberration, coma aberration, astigmatism, distortion, and axial chromatic aberration. In particular, when the first lens group G1 mainly corrects aberrations, the burden of correcting aberrations by the second lens group G2 can be reduced. In addition, Conditional Expression (5) is satisfied to downsize the optical system and to ensure a relatively long backfocus suitable for a digital single-lens reflex camera.

If the value is above the upper limit of Conditional Expressions (5) and (5'), the negative refractive power (power) of the surface on the image side of the negative lens (11 or 11') located closest to the object side of the first lens group G1 excessively increases, and aberrations, such as spherical aberration, coma aberration, and astigmatism, may increase. In addition, dispersion excessively increases, leading to an increase in size of the optical system.

If the value is below the lower limit of Conditional Expression (5), the negative refractive power (power) of the surface on the image side of the negative lens (11 or 11') located closest to the object side of the first lens group G1 excessively decreases, and axial chromatic aberration may not be corrected. In addition, a relatively long backfocus suitable for a digital single-lens reflex camera may not be ensured.

Conditional Expression (6) determines a ratio of a refractive index of a positive lens (13 or 12') having the largest refractive index of the first lens group G1 to a refractive index of a positive lens (12 or 14, or 14' or 15') having the smallest refractive index of the first lens group G1. Conditional Expression (6) is satisfied to appropriately correct the Petzval sum and to properly correct aberrations, such as spherical aberration, coma aberration, astigmatism, and field curvature.

If the value is below the lower limit of Conditional Expression (6), the refractive indices of the positive lenses of the first lens group G1 entirely excessively decrease, the Petzval sum is not appropriately corrected, and aberrations, such as spherical aberration, coma aberration, astigmatism, and field curvature, increase.

Conditional Expression (7) determines an average value of refractive indices of positive lenses (a set of 25 and 27, or a set of 25', 27', and 28') of the second-b lens subgroup G2b. Using a glass member having an Abbe number of 70 or more and a positive anomalous dispersion typically properly corrects axial chromatic aberration. However, such a glass member has a low refractive index of about 1.4 to about 1.5. A lens surface (refractive surface) has to have a stronger curvature to obtain a desirable refractive power. Consequently, spherical aberration and field curvature likely occur. To correct both axial chromatic aberration and field curvature, the refractive index of a glass member to be used for a positive lens has to be appropriately disposed. When a glass member that causes the average value of refractive indices of positive lenses of the second-b lens subgroup G2b to be 1.8 or more is used to satisfy Conditional Expression (7), the Petzval sum is appropriately corrected to correct both field curvature and axial chromatic aberration.

If the value is below the lower limit of Conditional Expression (7), spherical aberration, field curvature, and axial chromatic aberration may not be corrected, and optical performance may be deteriorated.

Conditional Expression (8) determines a ratio of a distance between a surface closest to the image side of the first lens group G1 and a surface closest to the object side of the second lens group G2 (a lens group distance between the first lens group G1 and the second lens group G2) to a distance between the surface closest to the object side of the first lens group G1 and the image surface I. Conditional Expression (8) is satisfied to prevent a sudden decrease of the intensity of ambient light in a peripheral portion, and to decrease the size and weight of lenses. Moreover, a change in aberration according to the imaging distance can be prevented. Furthermore, the weight of the focus lens group is decreased while the backfocus is appropriately kept.

If the value is above the upper limit of Conditional Expression (8), the lens diameter of the first lens group G1 has to be increased to keep the intensity of ambient light not to be suddenly decreased in a peripheral portion, leading to increases in size and weight of the lens.

If the value is below the lower limit of Conditional Expression (8), when at least a portion of the second lens group G2 is used as a focus lens group, the power of the focus lens group excessively increases, and a change in aberration according to the imaging distance increases. Moreover, to appropriately keep the backfocus, a negative refractive power is required in front of the second-b lens subgroup G2b and the diameter of the second-b lens subgroup G2b increases, leading to an increase in weight of the focus lens group.

NUMERICAL EXAMPLES

Specific Numerical Examples 1 to 11 are described. In each aberration diagram, each lateral aberration diagram, and each table, d-line, g-line, and C-line indicate aberrations for the respective wavelengths, S indicates aberration for a sagittal ray, M indicates aberration for a meridional ray, FNO. indicates an F-number, f indicates a focal length of the whole system, W indicates a half angle of view (°), Y indicates am image height, fB indicates a backfocus, L indicates a lens total length, r indicates a curvature radius, d indicates a lens thickness or a lens distance, N(d) indicates a refractive index for the d-line, v(d) indicates an Abbe number for the d-line, and "E-a" indicates "×10$^{-a}$". The unit of length is millimeter (mm).

A rotationally symmetric aspherical surface is defined by the following equation:

$$x=cy^2/[1+[1-(1+K)c^2y^2]^{1/2}]+A4y^4+A6y^6+A8y^8+A10y^{10}+A12y^{12}\ldots,$$

(where c is a curvature (1/r), y is a height from the optical axis, K is a conical constant, and A4, A6, A8, ... are aspherical coefficients of respective orders).

Numerical Example 1

Figure 2:
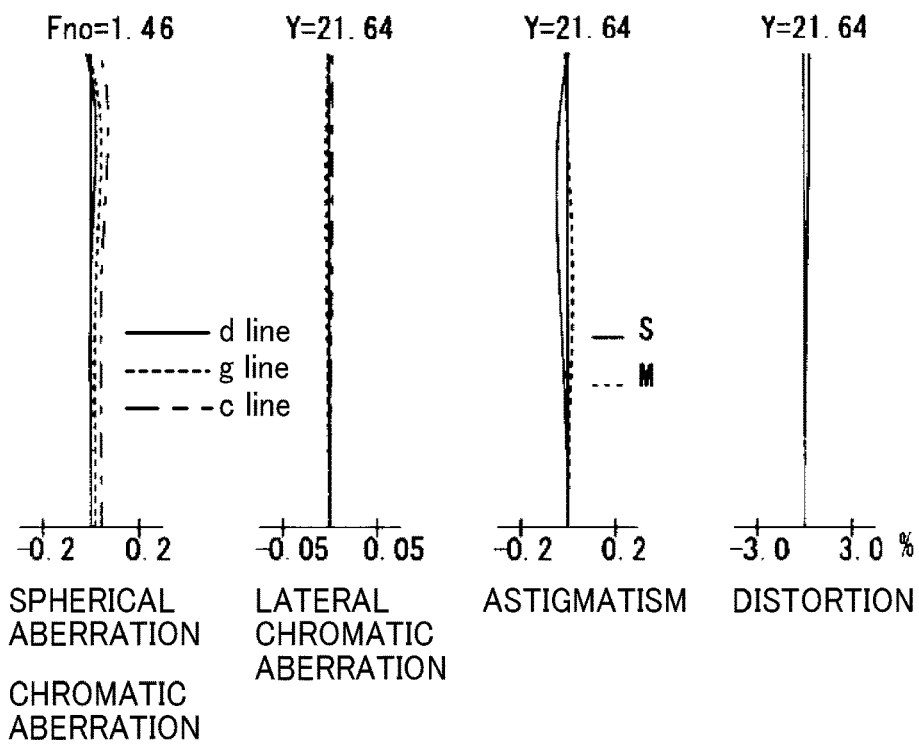
FIG. 2 includes aberration diagrams of the configuration in FIG. 1.
Figure 3:
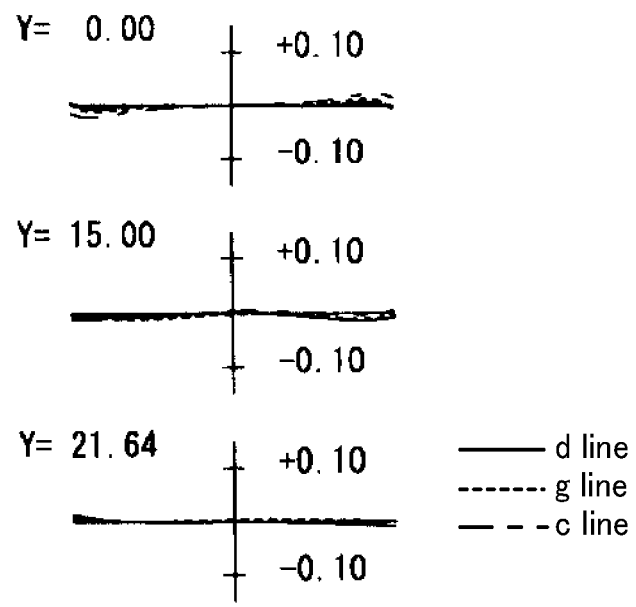
FIG. 3 includes lateral aberration diagrams of the configuration in FIG. 1.

FIGS. 1 to 3 and Tables 1 to 3 indicate an imaging lens system (single-focus lens system) according to Numerical Example 1. FIG. 1 is a lens configuration diagram in focus on an object at infinity, FIG. 2 includes aberration diagrams of the configuration, and FIG. 3 includes lateral aberration diagrams of the configuration. Table 1 presents surface data, Table 2 presents aspherical surface data, and Table 3 presents various types of data.

An imaging lens system according to Numerical Example 1 includes, sequentially from an object side, a first lens group G1 having a positive refractive power, and a second lens group G2 having a positive refractive power. A cover glass CG is provided between the second lens group G2 and an image surface I (at a position immediately front of the image surface I). The cover glass CG may function as an optical filter.

The first lens group G1 includes, sequentially from the object side, a biconcave negative lens 11, a positive meniscus lens 12 being convex on the object side, a positive meniscus lens 13 being convex on the object side, and a biconvex positive lens 14.

The second lens group G2 includes, sequentially from the object side, a second-a lens subgroup G2a having a positive refractive power, an aperture stop S, and a second-b lens subgroup G2b having a positive refractive power.

The second-a lens subgroup G2a includes, sequentially from the object side, a positive meniscus lens 21 being convex on the object side, a positive meniscus lens 22 being convex on the object side, and a negative meniscus lens 23 being convex on the object side.

The second-b lens subgroup G2b includes, sequentially from the object side, a biconcave negative lens 24, a biconvex positive lens 25, a negative meniscus lens 26 being convex on the image side, and a biconvex positive lens 27. The biconcave negative lens 24, the biconvex positive lens 25, and the negative meniscus lens 26 are cemented to one another. The biconvex positive lens 27 has aspherical surfaces on both sides.

TABLE 1

Surface Data

| Surface No. | r | d | N(d) | v(d) |
|---|---|---|---|---|
| 1 | -147.744 | 3.00 | 1.61340 | 44.3 |
| 2 | 111.331 | 1.50 | | |
| 3 | 117.598 | 7.46 | 1.43875 | 95.0 |
| 4 | 1219.409 | 2.00 | | |
| 5 | 210.888 | 6.26 | 1.89190 | 37.1 |
| 6 | 1594.059 | 0.50 | | |
| 7 | 96.924 | 10.45 | 1.43875 | 95.0 |
| 8 | -302.032 | 26.68 | | |
| 9 | 50.644 | 7.51 | 1.87070 | 40.7 |
| 10 | 107.717 | 0.30 | | |
| 11 | 34.996 | 10.97 | 1.43875 | 95.0 |
| 12 | 221.948 | 1.30 | | |
| 13 | 259.438 | 3.06 | 1.67300 | 38.3 |
| 14 | 22.654 | 8.88 | | |
| 15 (stop) | INFINITY | 5.12 | | |
| 16 | -38.068 | 1.30 | 1.64769 | 33.8 |
| 17 | 29.772 | 12.73 | 1.87070 | 40.7 |
| 18 | -50.288 | 2.00 | 1.59270 | 35.3 |
| 19 | -131.642 | 0.26 | | |
| 20* | 281.928 | 3.86 | 1.76450 | 49.1 |
| 21* | -91.708 | 37.97 | | |
| 22 | INFINITY | 2.00 | 1.51633 | 64.1 |
| 23 | INFINITY | — | | |

*is rotation-symmetrically aspherical surface.

TABLE 2

Aspherical Surface Data

| Surface No. | K | A4 | A6 | A8 | A10 | A12 |
|---|---|---|---|---|---|---|
| 20 | 0.000 | -0.1227E-05 | -0.4331E-08 | -0.9893E-12 | 0.9429E-14 | -0.9391E-17 |
| 21 | 0.000 | 0.1030E-05 | -0.4435E-08 | 0.3861E-11 | 0.5680E-14 | 0.0000E+00 |

TABLE 3

Various Data

| | |
|---|---|
| FNO. | 1.46 |
| f | 83.33 |
| W | 14.5 |
| Y | 21.64 |

TABLE 3-continued

| Various Data | |
|---|---|
| fB | 0.50 |
| L | 155.61 |

Numerical Example 2

Figure 4:
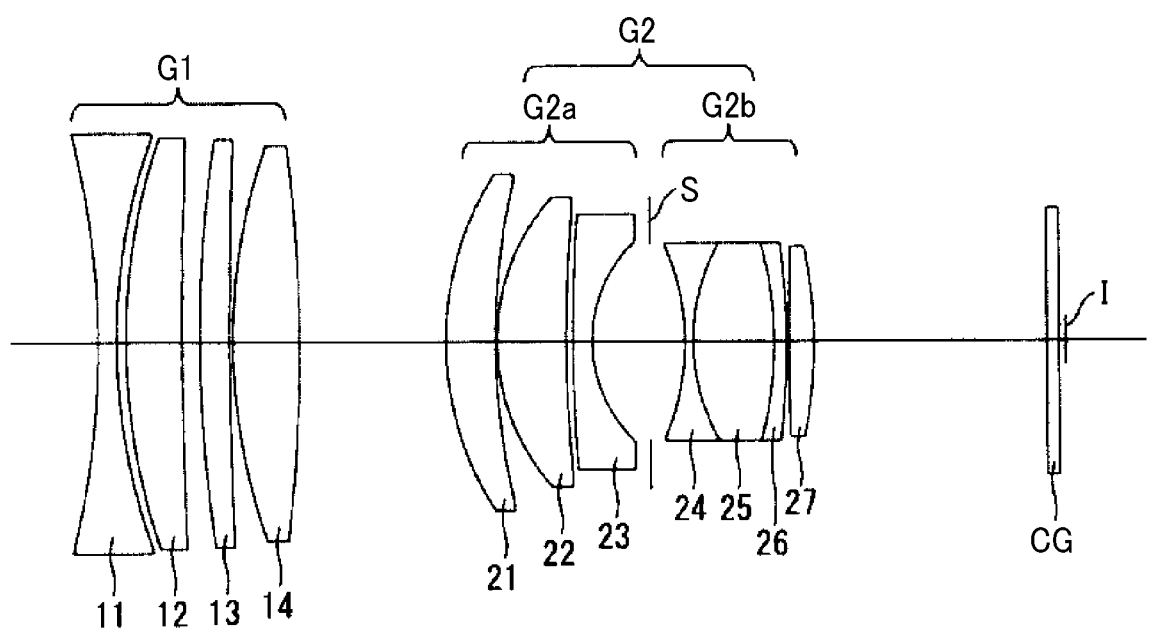
FIG. 4 is a lens configuration diagram of an imaging lens system in focus on an object at infinity according to Numerical Example 2.
Figure 5:
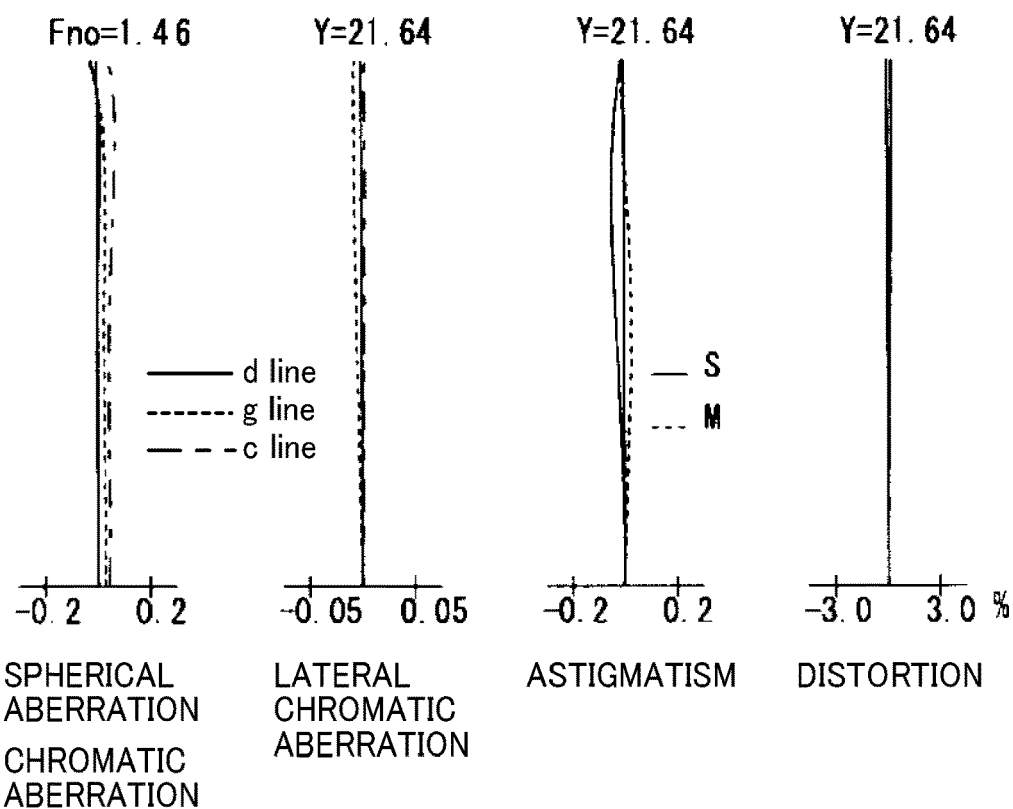
FIG. 5 includes aberration diagrams of the configuration in FIG. 4.
Figure 6:
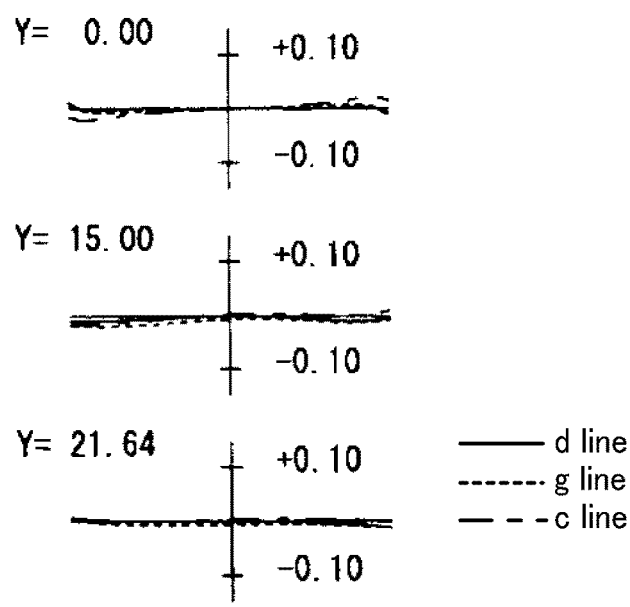
FIG. 6 includes lateral aberration diagrams of the configuration in FIG. 4.

FIGS. 4 to 6 and Tables 4 to 6 indicate an imaging lens system (single-focus lens system) according to Numerical Example 2. FIG. 4 is a lens configuration diagram in focus on an object at infinity, FIG. 5 includes aberration diagrams of the configuration, and FIG. 6 includes lateral aberration diagrams of the configuration. Table 4 presents surface data, Table 5 presents aspherical surface data, and Table 6 presents various types of data.

The lens configuration of the imaging lens system according to Numerical Example 2 is similar to the lens configuration of the imaging lens system according to Numerical Example 1.

TABLE 4

| Surface Data | | | | |
|---|---|---|---|---|
| Surface No. | r | d | N(d) | ν(d) |
| 1 | −143.184 | 3.00 | 1.56732 | 42.8 |
| 2 | 101.361 | 1.53 | | |
| 3 | 106.983 | 8.95 | 1.43875 | 95.0 |
| 4 | 806.223 | 2.83 | | |
| 5 | 225.248 | 4.81 | 1.95375 | 32.3 |
| 6 | 792.108 | 0.50 | | |
| 7 | 96.169 | 10.83 | 1.43875 | 95.0 |
| 8 | −270.740 | 23.60 | | |
| 9 | 50.974 | 7.99 | 1.88300 | 40.8 |
| 10 | 112.036 | 0.30 | | |
| 11 | 35.626 | 11.15 | 1.43875 | 95.0 |
| 12 | 227.304 | 1.13 | | |
| 13 | 268.804 | 3.12 | 1.67300 | 38.3 |
| 14 | 22.716 | 9.42 | | |
| 15 (stop) | INFINITY | 5.70 | | |
| 16 | −38.353 | 1.30 | 1.64769 | 33.8 |
| 17 | 32.259 | 13.18 | 1.88300 | 40.8 |
| 18 | −60.377 | 2.00 | 1.59270 | 35.3 |
| 19 | −128.239 | 0.39 | | |
| 20* | 331.687 | 4.04 | 1.72903 | 54.0 |
| 21* | −78.431 | 37.97 | | |
| 22 | INFINITY | 2.00 | 1.51633 | 64.1 |
| 23 | INFINITY | — | | |

*is rotation-symmetrically aspherical surface.

TABLE 5

| Aspherical Surface Data | | | | | | |
|---|---|---|---|---|---|---|
| Surface No. | K | A4 | A6 | A8 | A10 | A12 |
| 20 | 0.000 | −0.1321E−05 | −0.4141E−08 | 0.3165E−11 | 0.4443E−14 | −0.1468E−16 |
| 21 | 0.000 | 0.8709E−06 | −0.5206E−08 | 0.1132E−10 | −0.9868E−14 | 0.0000E+00 |

TABLE 6

| Various Data | |
|---|---|
| FNO. | 1.46 |
| f | 83.33 |
| W | 14.5 |
| Y | 21.64 |

TABLE 6-continued

| Various Data | |
|---|---|
| fB | 0.50 |
| L | 156.26 |

Numerical Example 3

Figure 7:
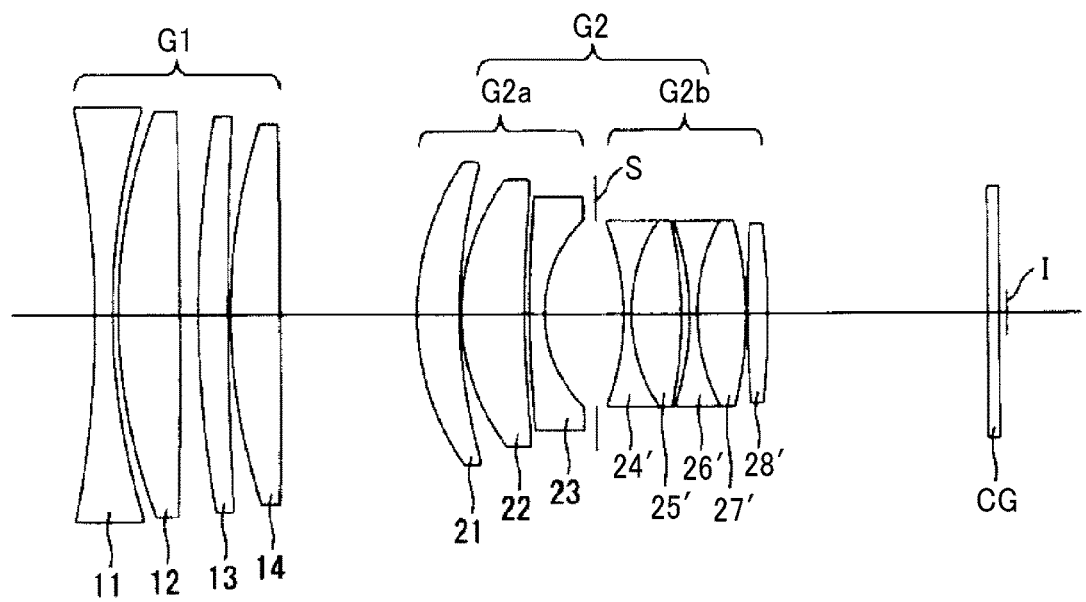
FIG. 7 is a lens configuration diagram of an imaging lens system in focus on an object at infinity according to Numerical Example 3.
Figure 8:
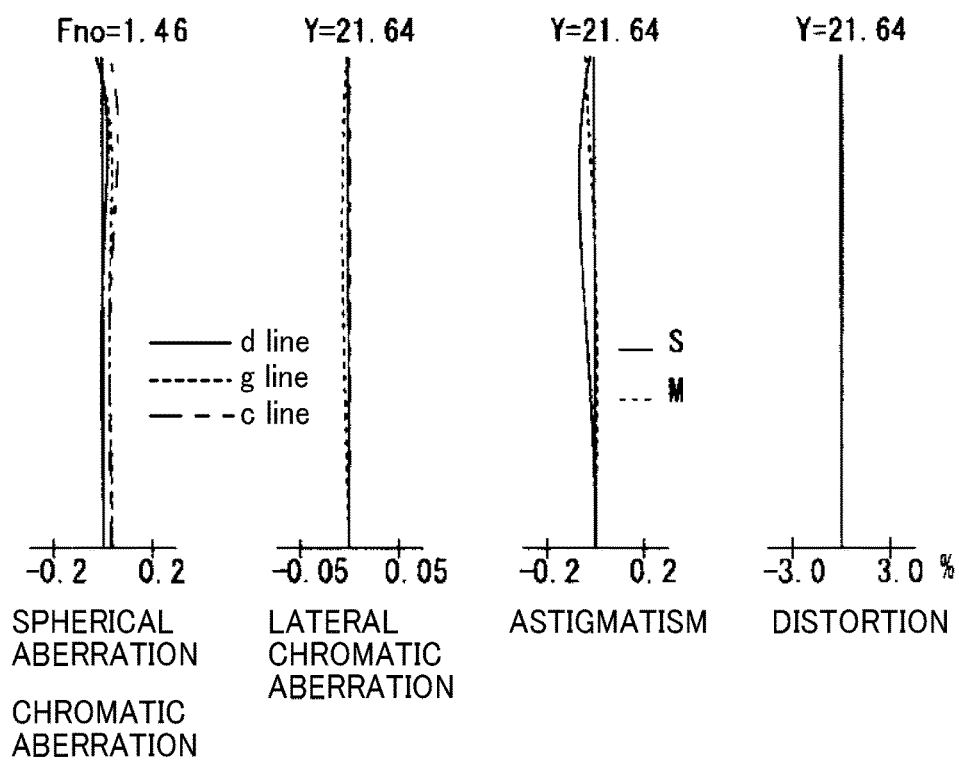
FIG. 8 includes aberration diagrams of the configuration in FIG. 7.
Figure 9:
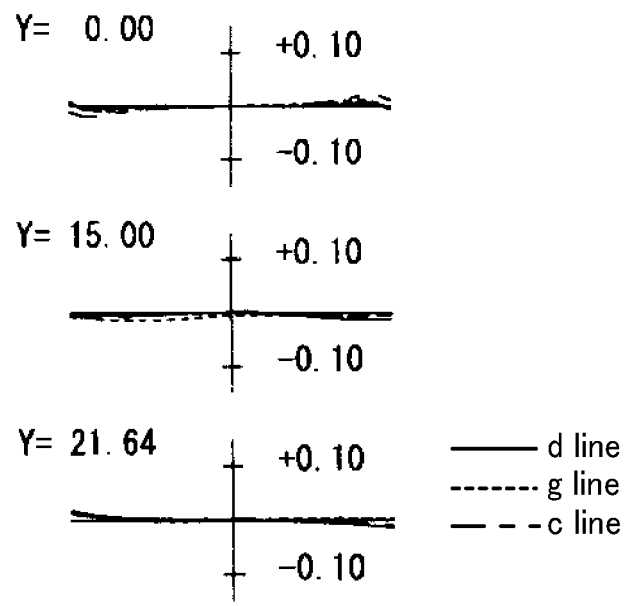
FIG. 9 includes lateral aberration diagrams of the configuration in FIG. 7.

FIGS. 7 to 9 and Tables 7 to 9 indicate an imaging lens system (single-focus lens system) according to Numerical Example 3. FIG. 7 is a lens configuration diagram in focus on an object at infinity, FIG. 8 includes aberration diagrams of the configuration, and FIG. 9 includes lateral aberration diagrams of the configuration. Table 7 presents surface data, Table 8 presents aspherical surface data, and Table 9 presents various types of data.

The lens configuration of the imaging lens system according to Numerical Example 3 is similar to the lens configuration of the imaging lens system according to Numerical Example 1 except the following points.

(A) The positive lens 12 of the first lens group G1 includes a biconvex positive lens.

(B) The second-b lens subgroup G2b includes, sequentially from the object side, a biconcave negative lens 24', a biconvex positive lens 25', a biconcave negative lens 26', a biconvex positive lens 27', and a biconvex positive lens 28'. The biconcave negative lens 24' and the biconvex positive lens 25' are cemented to each other. The biconcave negative lens 26' and the biconvex positive lens 27' are cemented to each other. The biconvex positive lens 28' has aspherical surfaces on both sides.

TABLE 7

| Surface Data | | | | |
|---|---|---|---|---|
| Surface No. | r | d | N(d) | ν(d) |
| 1 | −189.565 | 3.00 | 1.61340 | 44.3 |
| 2 | 122.530 | 1.01 | | |
| 3 | 100.426 | 10.60 | 1.43875 | 95.0 |
| 4 | −1550.216 | 3.14 | | |
| 5 | 200.965 | 5.07 | 1.88300 | 40.8 |
| 6 | 637.929 | 0.50 | | |
| 7 | 106.673 | 8.51 | 1.43875 | 95.0 |
| 8 | −2149.801 | 23.43 | | |
| 9 | 46.311 | 7.31 | 1.87070 | 40.7 |
| 10 | 93.871 | 0.30 | | |
| 11 | 37.788 | 10.88 | 1.43875 | 95.0 |
| 12 | 213.732 | 0.93 | | |

TABLE 7-continued

| Surface Data | | | | |
|---|---|---|---|---|
| Surface No. | r | d | N(d) | ν(d) |
| 13 | 238.884 | 2.50 | 1.67300 | 38.3 |
| 14 | 22.724 | 8.90 | | |

TABLE 7-continued

Surface Data

| Surface No. | r | d | N(d) | v(d) |
|---|---|---|---|---|
| 15 (stop) | INFINITY | 4.81 | | |
| 16 | −42.077 | 1.30 | 1.67300 | 38.3 |
| 17 | 29.272 | 8.62 | 1.89190 | 37.1 |
| 18 | −74.730 | 1.44 | | |
| 19 | −48.210 | 1.30 | 1.73800 | 32.3 |
| 20 | 34.393 | 8.38 | 1.83481 | 42.7 |
| 21 | −63.703 | 0.25 | | |
| 22* | 206.484 | 3.46 | 1.69350 | 53.2 |
| 23* | −144.341 | 38.06 | | |
| 24 | INFINITY | 2.00 | 1.51633 | 64.1 |
| 25 | INFINITY | — | | |

*is rotation-symmetrically aspherical surface.

TABLE 8

Aspherical Surface Data

| Surface No. | K | A4 | A6 | A8 | A10 | A12 |
|---|---|---|---|---|---|---|
| 22 | 0.000 | −0.1010E−05 | −0.7022E−08 | 0.7043E−11 | −0.5523E−14 | −0.4109E−17 |
| 23 | 0.000 | 0.1762E−05 | −0.6400E−08 | 0.1058E−10 | −0.6034E−14 | 0.0000E+00 |

TABLE 9

Various Data

| FNO. | 1.46 |
|---|---|
| f | 83.42 |
| W | 14.5 |
| Y | 21.64 |
| fB | 0.50 |
| L | 156.20 |

Numerical Example 4

Figure 10:
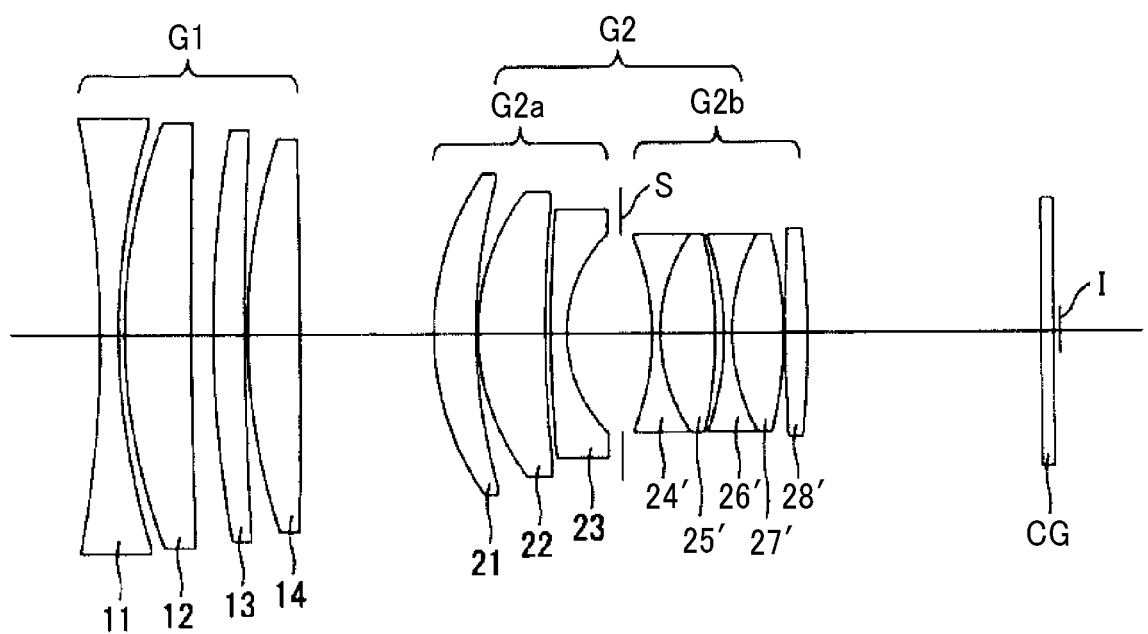
FIG. 10 is a lens configuration diagram of an imaging lens system in focus on an object at infinity according to Numerical Example 4.
Figure 11:
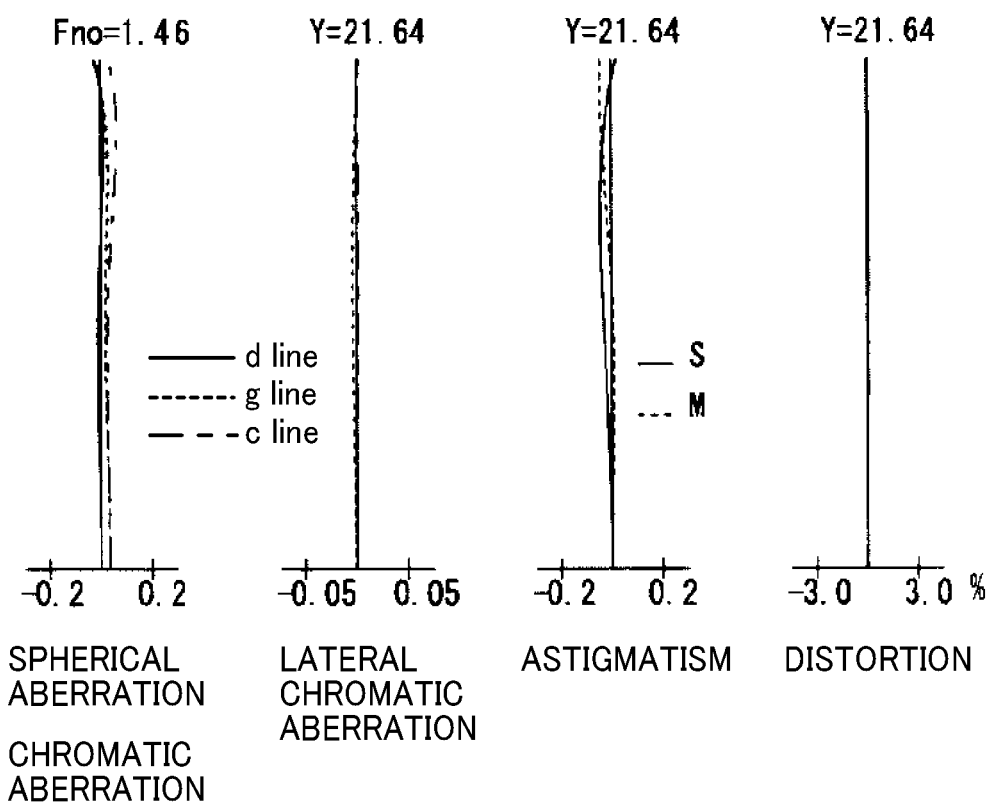
FIG. 11 includes aberration diagrams of the configuration in FIG. 10.
Figure 12:
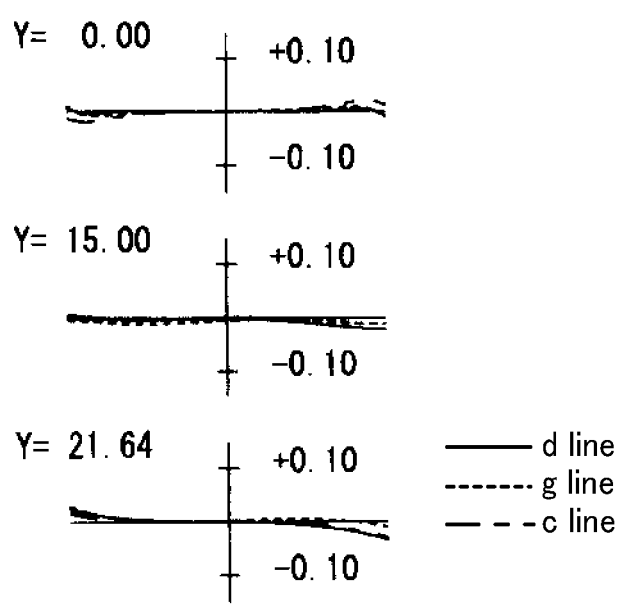
FIG. 12 includes lateral aberration diagrams of the configuration in FIG. 10.

FIGS. 10 to 12 and Tables 10 to 12 indicate an imaging lens system (single-focus lens system) according to Numerical Example 4. FIG. 10 is a lens configuration diagram in focus on an object at infinity, FIG. 11 includes aberration diagrams of the configuration, and FIG. 12 includes lateral aberration diagrams of the configuration. Table 10 presents surface data, Table 11 presents aspherical surface data, and Table 12 presents various types of data.

The lens configuration of the imaging lens system according to Numerical Example 4 is similar to the lens configuration of the imaging lens system according to Numerical Example 3 except the following point.

(A) The positive lens 12 of the first lens group G1 includes a positive meniscus lens being convex on the object side.

TABLE 10

Surface Data

| Surface No. | r | d | N(d) | v(d) |
|---|---|---|---|---|
| 1 | −188.447 | 3.00 | 1.58144 | 40.7 |
| 2 | 118.858 | 1.00 | | |
| 3 | 97.721 | 10.75 | 1.43875 | 95.0 |
| 4 | 1352.241 | 3.48 | | |
| 5 | 193.762 | 5.04 | 1.91082 | 35.2 |
| 6 | 594.289 | 0.50 | | |
| 7 | 104.334 | 8.43 | 1.43875 | 95.0 |
| 8 | −1852.971 | 21.44 | | |
| 9 | 46.207 | 6.77 | 1.88300 | 40.8 |
| 10 | 92.373 | 0.30 | | |
| 11 | 37.808 | 10.95 | 1.43875 | 95.0 |
| 12 | 218.126 | 0.93 | | |
| 13 | 236.963 | 2.50 | 1.67300 | 38.3 |
| 14 | 22.785 | 8.94 | | |
| 15 (stop) | INFINITY | 4.89 | | |
| 16 | −41.945 | 1.30 | 1.67300 | 38.3 |
| 17 | 28.925 | 8.76 | 1.89190 | 37.1 |
| 18 | −74.873 | 1.47 | | |
| 19 | −48.118 | 1.30 | 1.73800 | 32.3 |
| 20 | 34.028 | 8.24 | 1.83481 | 42.7 |
| 21 | −63.739 | 0.25 | | |
| 22* | 211.200 | 3.59 | 1.72903 | 54.0 |
| 23* | −156.194 | 37.97 | | |
| 24 | INFINITY | 2.00 | 1.51633 | 64.1 |
| 25 | INFINITY | — | | |

*is rotation-symmetrically aspherical surface.

TABLE 11

Aspherical Surface Data

| Surface No. | K | A4 | A6 | A8 | A10 | A12 |
|---|---|---|---|---|---|---|
| 22 | 0.000 | −0.1010E−05 | −0.7022E−08 | 0.7043E−11 | −0.5523E−14 | −0.4109E−17 |
| 23 | 0.000 | 0.1762E−05 | −0.6400E−08 | 0.1058E−10 | −0.6034E−14 | 0.0000E+00 |

TABLE 12

Various Data

| FNO. | 1.46 |
|---|---|
| f | 82.48 |
| W | 14.7 |

TABLE 12-continued

Various Data

| | |
|---|---|
| Y | 21.64 |
| fB | 0.50 |
| L | 154.29 |

Numerical Example 5

Figure 13:
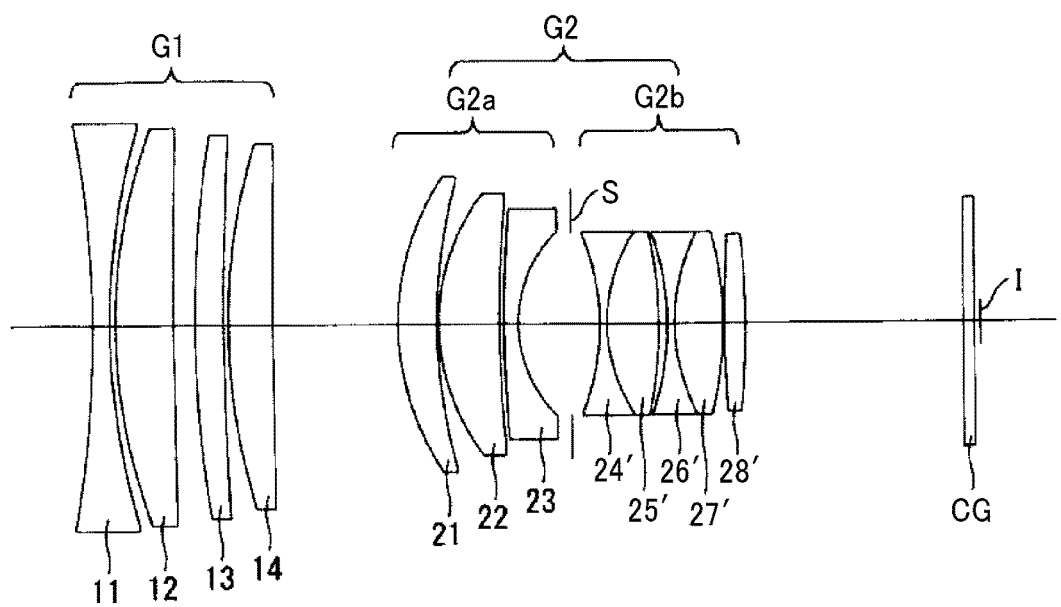
FIG. 13 is a lens configuration diagram of an imaging lens system in focus on an object at infinity according to Numerical Example 5.
Figure 14:
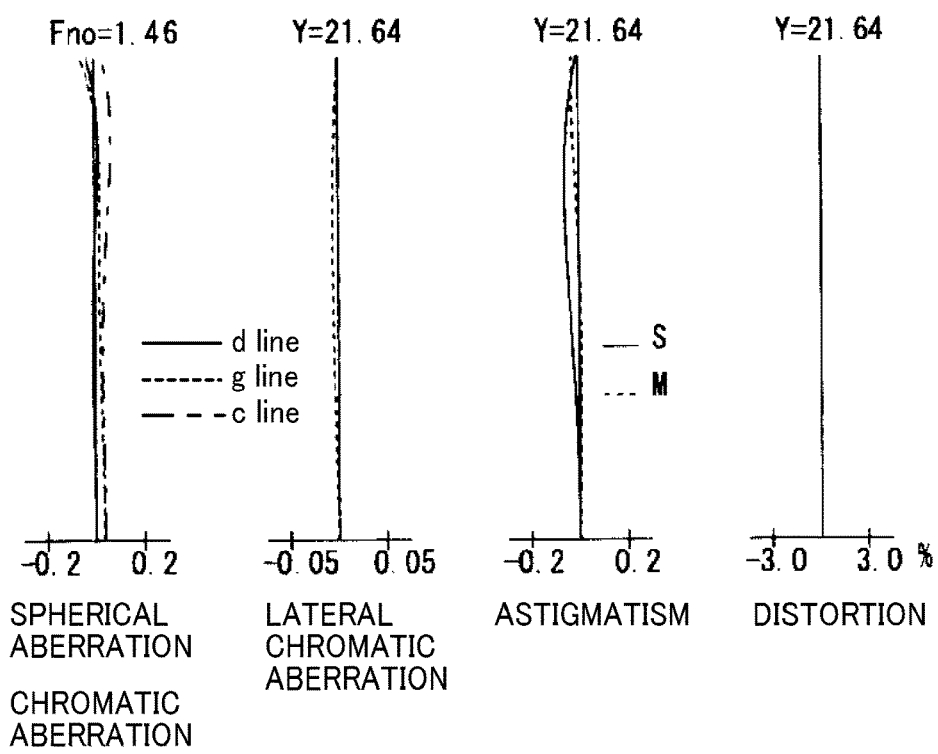
FIG. 14 includes aberration diagrams of the configuration in FIG. 13.
Figure 15:
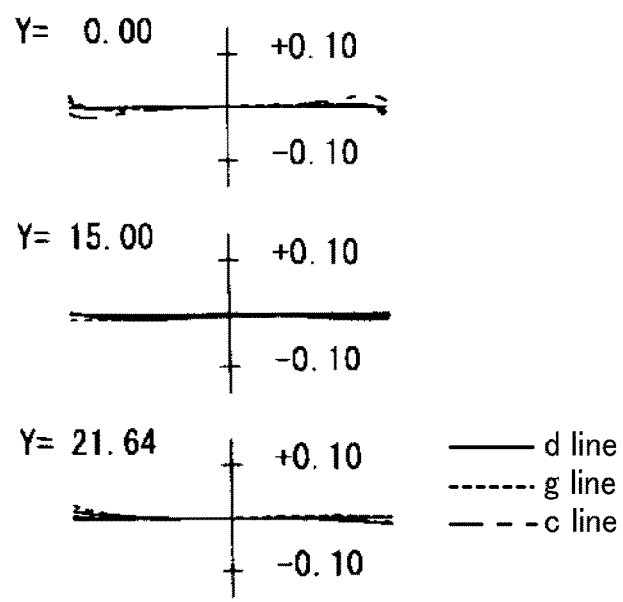
FIG. 15 includes lateral aberration diagrams of the configuration in FIG. 13.

FIGS. 13 to 15 and Tables 13 to 15 indicate an imaging lens system (single-focus lens system) according to Numerical Example 5. FIG. 13 is a lens configuration diagram in focus on an object at infinity, FIG. 14 includes aberration diagrams of the configuration, and FIG. 15 includes lateral aberration diagrams of the configuration. Table 13 presents surface data, Table 14 presents aspherical surface data, and Table 15 presents various types of data.

The lens configuration of the imaging lens system according to Numerical Example 5 is similar to the lens configuration of the imaging lens system according to Numerical Example 4 except the following point.

(A) The positive lens 14 of the first lens group G1 includes a positive meniscus lens being convex on the object side.

TABLE 13

Surface Data

| Surface No. | r | d | N(d) | ν(d) |
|---|---|---|---|---|
| 1 | −197.073 | 3.00 | 1.60342 | 38.0 |
| 2 | 122.435 | 1.00 | | |
| 3 | 99.047 | 10.18 | 1.49700 | 81.6 |
| 4 | 1864.707 | 3.57 | | |
| 5 | 204.358 | 5.04 | 1.90366 | 31.3 |
| 6 | 545.192 | 0.79 | | |
| 7 | 109.638 | 7.76 | 1.49700 | 81.6 |
| 8 | 2171.489 | 21.35 | | |
| 9 | 46.114 | 6.79 | 1.88300 | 40.8 |
| 10 | 93.856 | 0.30 | | |
| 11 | 37.318 | 10.61 | 1.43875 | 95.0 |
| 12 | 226.504 | 0.83 | | |
| 13 | 243.524 | 2.50 | 1.67300 | 38.3 |
| 14 | 22.574 | 9.11 | | |
| 15 (stop) | INFINITY | 4.90 | | |
| 16 | −41.781 | 1.30 | 1.67300 | 38.3 |
| 17 | 29.037 | 8.96 | 1.89190 | 37.1 |
| 18 | −74.538 | 1.47 | | |
| 19 | −47.938 | 1.30 | 1.73800 | 32.3 |
| 20 | 34.791 | 8.40 | 1.83481 | 42.7 |
| 21 | −63.765 | 0.25 | | |
| 22* | 208.307 | 3.62 | 1.69680 | 55.5 |
| 23* | −138.388 | 37.97 | | |
| 24 | INFINITY | 2.00 | 1.51633 | 64.1 |
| 25 | INFINITY | — | | |

*is rotation-symmetrically aspherical surface.

TABLE 14

Aspherical Surface Data

| Surface No. | K | A4 | A6 | A8 | A10 | A12 |
|---|---|---|---|---|---|---|
| 22 | 0.000 | −0.1010E−05 | −0.7022E−08 | 0.7043E−11 | −0.5523E−14 | −0.4109E−17 |
| 23 | 0.000 | 0.1762E−05 | −0.6400E−08 | 0.1058E−10 | −0.6034E−14 | 0.0000E+00 |

TABLE 15

Various Data

| | |
|---|---|
| FNO. | 1.46 |
| f | 82.46 |
| W | 14.7 |
| Y | 21.64 |
| fB | 0.50 |
| L | 153.50 |

Numerical Example 6

Figure 16:
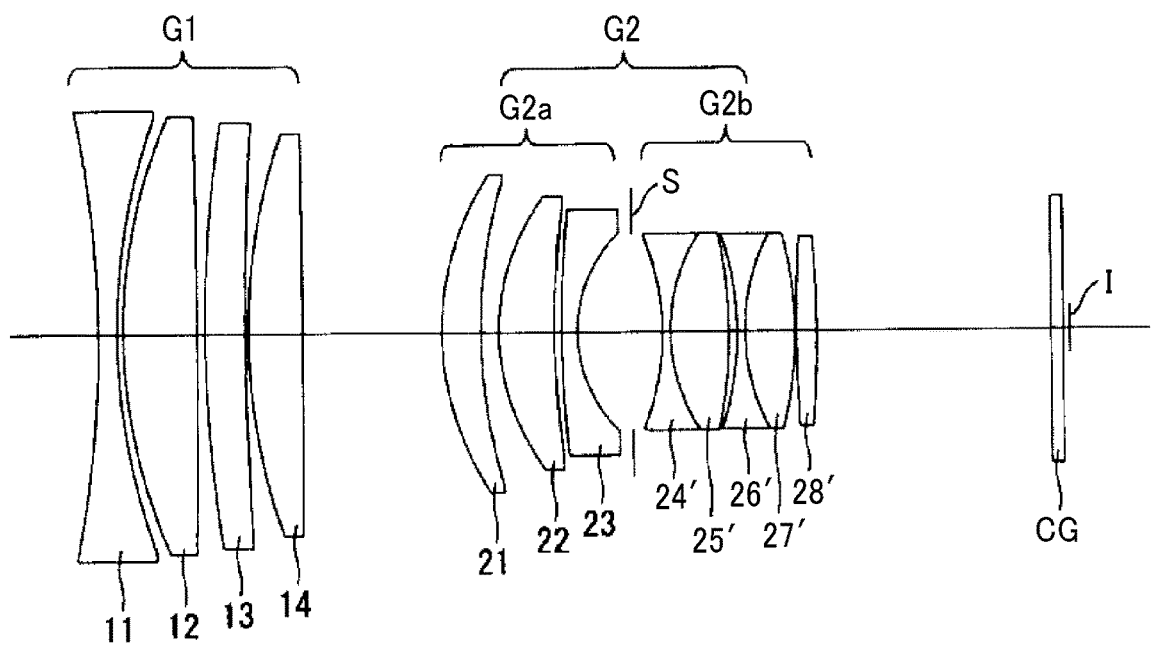
FIG. 16 is a lens configuration diagram of an imaging lens system in focus on an object at infinity according to Numerical Example 6.
Figure 17:
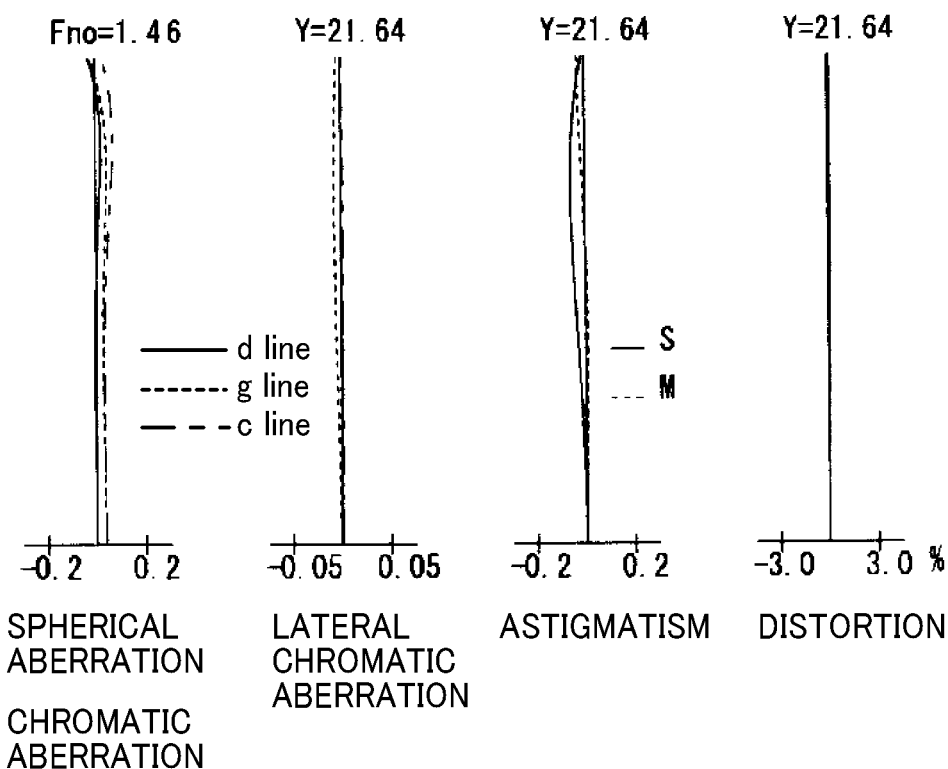
FIG. 17 includes aberration diagrams of the configuration in FIG. 16.
Figure 18:
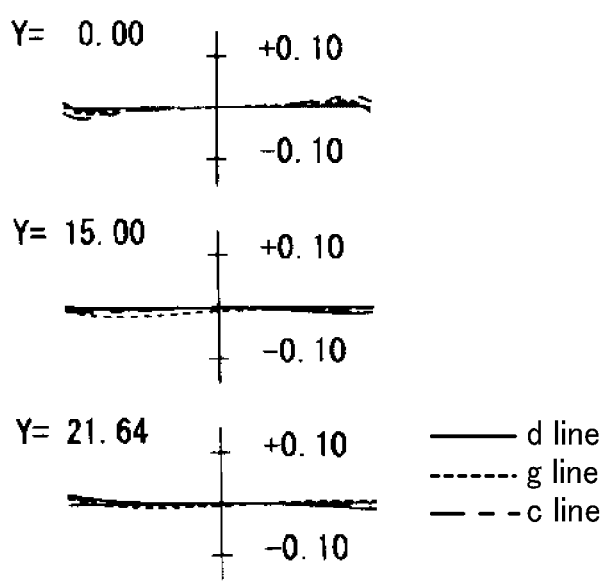
FIG. 18 includes lateral aberration diagrams of the configuration in FIG. 16.

FIGS. 16 to 18 and Tables 16 to 18 indicate an imaging lens system (single-focus lens system) according to Numerical Example 6. FIG. 16 is a lens configuration diagram in focus on an object at infinity, FIG. 17 includes aberration diagrams of the configuration, and FIG. 18 includes lateral aberration diagrams of the configuration. Table 16 presents surface data, Table 17 presents aspherical surface data, and Table 18 presents various types of data.

The lens configuration of the imaging lens system according to Numerical Example 6 is similar to the lens configuration of the imaging lens system according to Numerical Example 3.

TABLE 16

Surface Data

| Surface No. | r | d | N(d) | ν(d) |
|---|---|---|---|---|
| 1 | −184.081 | 3.00 | 1.53172 | 48.9 |
| 2 | 104.088 | 1.00 | | |
| 3 | 89.756 | 12.00 | 1.43875 | 95.0 |
| 4 | −1724.425 | 1.27 | | |
| 5 | 221.435 | 6.50 | 1.80420 | 46.5 |
| 6 | 538.326 | 0.50 | | |
| 7 | 100.834 | 8.73 | 1.43875 | 95.0 |
| 8 | −2765.032 | 22.45 | | |
| 9 | 46.774 | 6.38 | 1.88300 | 40.8 |
| 10 | 87.489 | 2.88 | | |
| 11 | 37.043 | 9.09 | 1.49700 | 81.6 |
| 12 | 163.588 | 1.08 | | |
| 13 | 191.570 | 2.50 | 1.67300 | 38.3 |
| 14 | 22.779 | 8.91 | | |
| 15 (stop) | INFINITY | 4.81 | | |
| 16 | −42.372 | 1.30 | 1.67300 | 38.3 |
| 17 | 29.449 | 9.45 | 1.90043 | 37.4 |
| 18 | −76.395 | 1.45 | | |
| 19 | −48.726 | 1.30 | 1.73800 | 32.3 |
| 20 | 35.168 | 8.08 | 1.83481 | 42.7 |
| 21 | −63.837 | 0.25 | | |
| 22* | 222.558 | 3.27 | 1.77250 | 49.5 |
| 23* | −177.978 | 37.97 | | |
| 24 | INFINITY | 2.00 | 1.51633 | 64.1 |
| 25 | INFINITY | — | | |

*is rotation-symmetrically aspherical surface.

TABLE 17

Aspherical Surface Data

| Surface No. | K | A4 | A6 | A8 | A10 | A12 |
|---|---|---|---|---|---|---|
| 22 | 0.000 | −0.6615E−06 | −0.7014E−08 | 0.6562E−11 | −0.3779E−14 | −0.8162E−17 |
| 23 | 0.000 | 0.1789E−05 | −0.6620E−08 | 0.1089E−10 | −0.8436E−14 | 0.0000E+00 |

TABLE 18

Various Data

| | |
|---|---|
| FNO. | 1.46 |
| f | 83.42 |
| W | 14.5 |
| Y | 21.64 |
| fB | 0.50 |
| L | 156.69 |

Numerical Example 7

Figure 19:
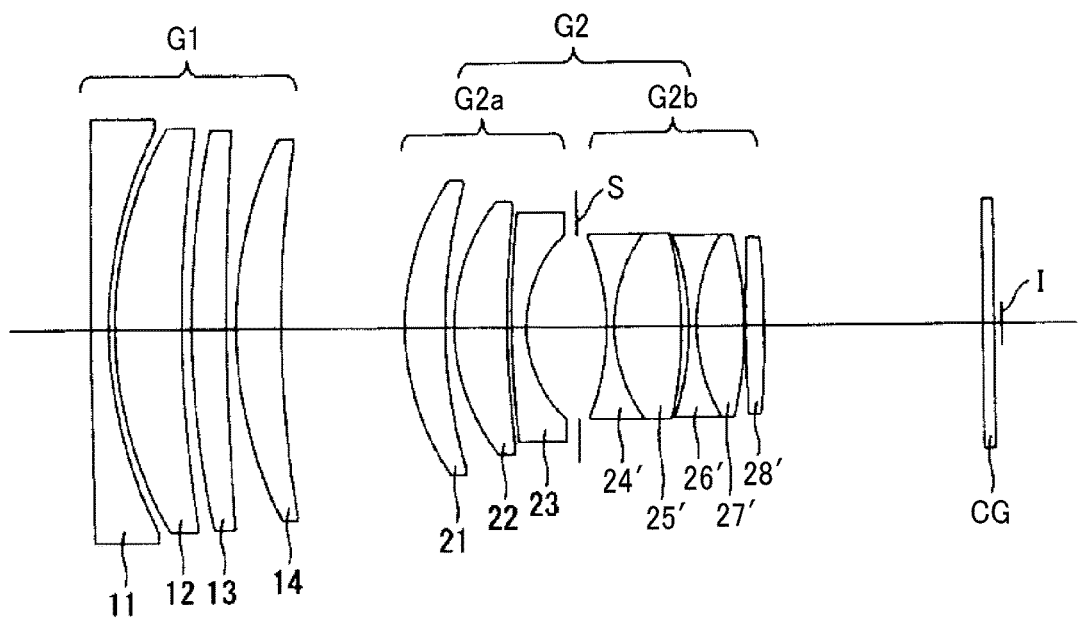
FIG. 19 is a lens configuration diagram of an imaging lens system in focus on an object at infinity according to Numerical Example 7.
Figure 20:
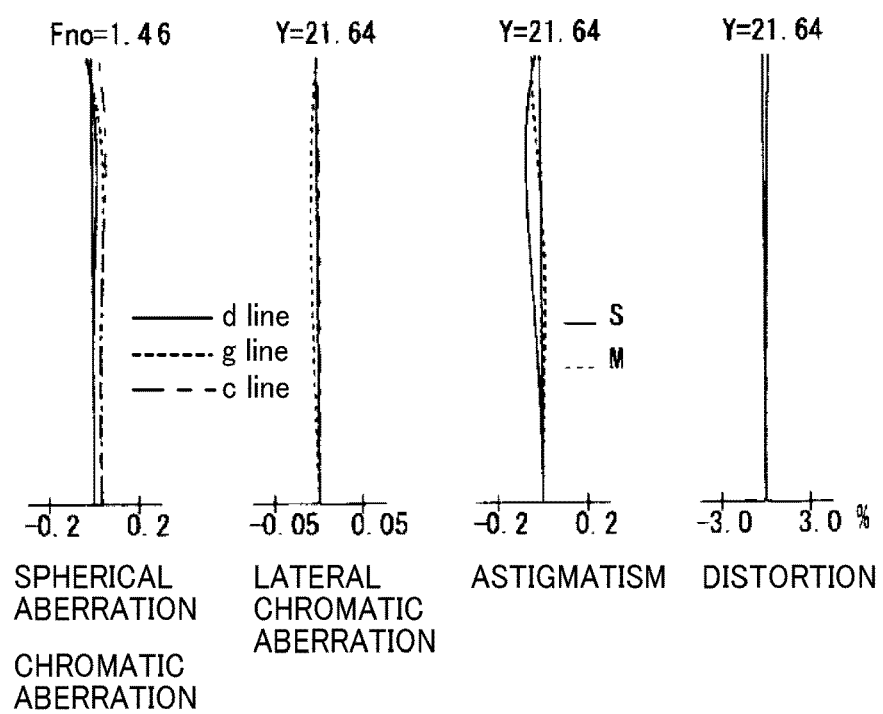
FIG. 20 includes aberration diagrams of the configuration in FIG. 19.
Figure 21:
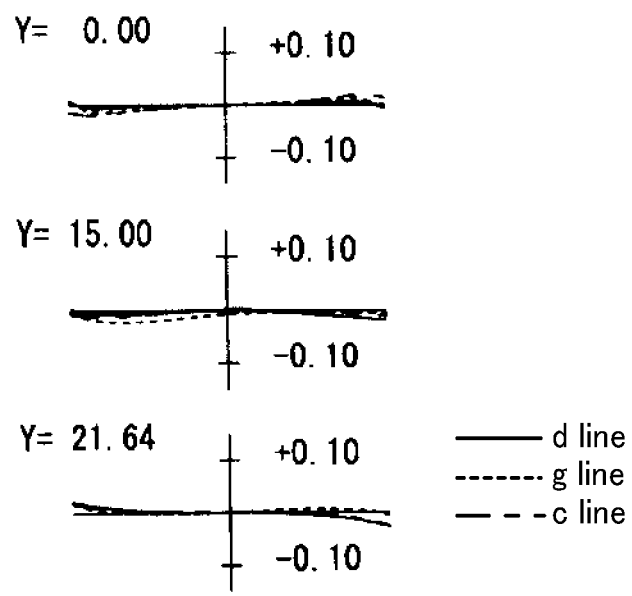
FIG. 21 includes lateral aberration diagrams of the configuration in FIG. 19.

FIGS. 19 to 21 and Tables 19 to 21 indicate an imaging lens system (single-focus lens system) according to Numerical Example 7. FIG. 19 is a lens configuration diagram in focus on an object at infinity, FIG. 20 includes aberration diagrams of the configuration, and FIG. 21 includes lateral aberration diagrams of the configuration. Table 19 presents surface data, Table 20 presents aspherical surface data, and Table 21 presents various types of data.

The lens configuration of the imaging lens system according to Numerical Example 7 is similar to the lens configuration of the imaging lens system according to Numerical Example 5 except the following point.

(A) The negative lens 11 of the first lens group G1 includes a negative meniscus lens being convex on the object side.

TABLE 19

Surface Data

| Surface No. | r | d | N(d) | ν(d) |
|---|---|---|---|---|
| 1 | 2771.910 | 3.00 | 1.61340 | 44.3 |
| 2 | 77.550 | 1.06 | | |
| 3 | 71.072 | 11.59 | 1.43875 | 95.0 |
| 4 | 233.833 | 1.70 | | |
| 5 | 169.341 | 5.96 | 1.83481 | 42.7 |
| 6 | 504.067 | 1.56 | | |
| 7 | 75.757 | 7.72 | 1.43875 | 95.0 |
| 8 | 208.698 | 21.29 | | |
| 9 | 45.357 | 7.07 | 1.88300 | 40.8 |
| 10 | 91.220 | 1.57 | | |
| 11 | 36.235 | 9.13 | 1.43875 | 95.0 |
| 12 | 182.643 | 0.80 | | |
| 13 | 189.667 | 2.50 | 1.67300 | 38.3 |

TABLE 19-continued

Surface Data

| Surface No. | r | d | N(d) | ν(d) |
|---|---|---|---|---|
| 14 | 22.507 | 8.89 | | |
| 15 (stop) | INFINITY | 4.90 | | |
| 16 | −40.735 | 1.30 | 1.67300 | 38.3 |
| 17 | 27.931 | 11.61 | 1.90043 | 37.4 |
| 18 | −67.789 | 1.30 | | |
| 19 | −47.419 | 1.30 | 1.73800 | 32.3 |
| 20 | 32.679 | 8.18 | 1.83481 | 42.7 |
| 21 | −66.970 | 0.25 | | |
| 22* | 190.114 | 3.25 | 1.77250 | 49.5 |
| 23* | −202.190 | 37.97 | | |
| 24 | INFINITY | 2.00 | 1.51633 | 64.1 |
| 25 | INFINITY | — | | |

*is rotation-symmetrically aspherical surface.

TABLE 20

Aspherical Surface Data

| Surface No. | K | A4 | A6 | A8 | A10 | A12 |
|---|---|---|---|---|---|---|
| 22 | 0.000 | −0.2510E−05 | −0.1181E−07 | 0.1073E−11 | −0.2199E−13 | −0.2692E−16 |
| 23 | 0.000 | 0.2395E−06 | −0.1141E−07 | 0.9221E−11 | −0.3610E−13 | 0.0000E+00 |

TABLE 21

Various Data

| | |
|---|---|
| FNO. | 1.46 |
| f | 83.42 |
| W | 14.5 |
| Y | 21.64 |
| fB | 0.50 |
| L | 156.40 |

Numerical Example 8

Figure 22:
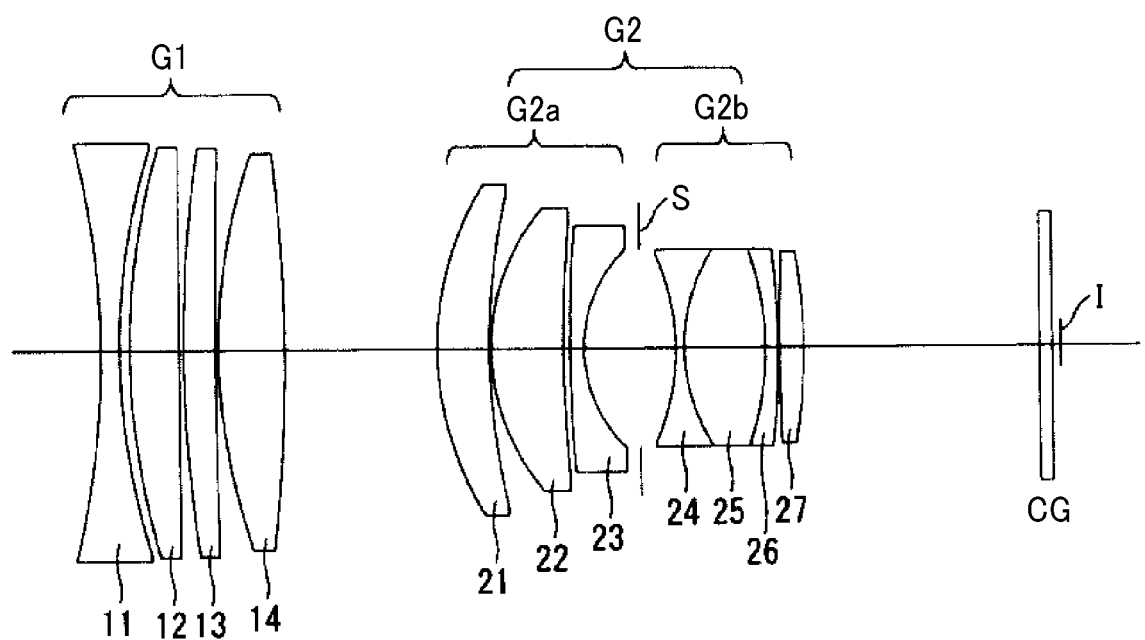
FIG. 22 is a lens configuration diagram of an imaging lens system in focus on an object at infinity according to Numerical Example 8.
Figure 23:
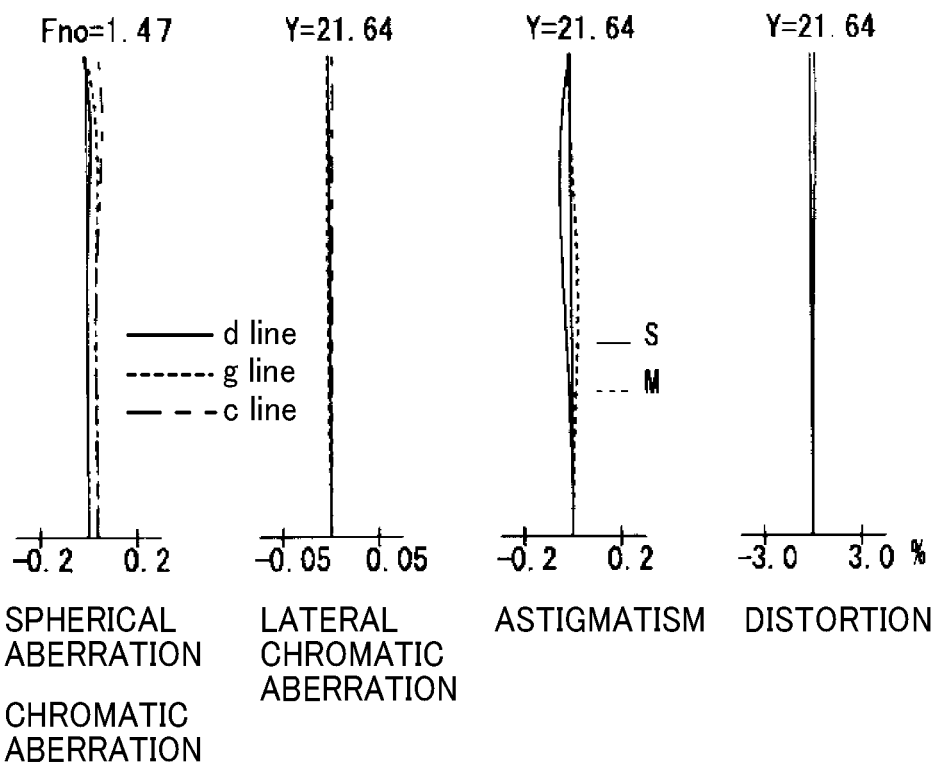
FIG. 23 includes aberration diagrams of the configuration in FIG. 22.
Figure 24:
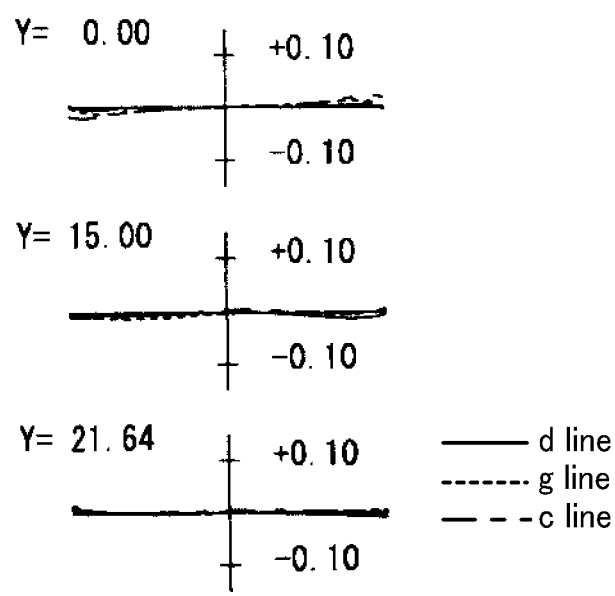
FIG. 24 includes lateral aberration diagrams of the configuration in FIG. 22.

FIGS. 22 to 24 and Tables 22 to 24 indicate an imaging lens system (single-focus lens system) according to Numerical Example 8. FIG. 22 is a lens configuration diagram in focus on an object at infinity, FIG. 23 includes aberration diagrams of the configuration, and FIG. 24 includes lateral aberration diagrams of the configuration. Table 22 presents surface data, Table 23 presents aspherical surface data, and Table 24 presents various types of data.

The lens configuration of the imaging lens system according to Numerical Example 8 is similar to the lens configuration of the imaging lens system according to Numerical Example 1 except the following point.

(A) The positive lens 12 of the first lens group G1 includes a biconvex positive lens.

TABLE 22

Surface Data

| Surface No. | r | d | N(d) | ν(d) |
|---|---|---|---|---|
| 1 | −139.880 | 3.00 | 1.61340 | 44.3 |
| 2 | 112.158 | 1.58 | | |
| 3 | 116.552 | 7.98 | 1.43875 | 95.0 |
| 4 | −8383.964 | 0.61 | | |
| 5 | 223.014 | 5.02 | 1.91082 | 35.2 |
| 6 | 1115.178 | 0.50 | | |
| 7 | 97.484 | 10.53 | 1.43875 | 95.0 |
| 8 | −278.224 | 24.35 | | |
| 9 | 50.692 | 8.37 | 1.87070 | 40.7 |
| 10 | 111.676 | 0.30 | | |
| 11 | 35.422 | 11.49 | 1.43875 | 95.0 |
| 12 | 218.664 | 1.10 | | |
| 13 | 255.875 | 2.21 | 1.67300 | 38.3 |
| 14 | 22.738 | 8.94 | | |
| 15 (stop) | INFINITY | 5.75 | | |
| 16 | −37.151 | 1.30 | 1.64769 | 33.8 |
| 17 | 29.471 | 13.10 | 1.87070 | 40.7 |
| 18 | −48.561 | 2.00 | 1.59270 | 35.3 |
| 19 | −141.966 | 0.25 | | |
| 20* | 272.103 | 3.91 | 1.76450 | 49.1 |
| 21* | −88.917 | 37.97 | | |
| 22 | INFINITY | 2.00 | 1.51633 | 64.1 |
| 23 | INFINITY | — | | |

*is rotation-symmetrically aspherical surface.

TABLE 23

Aspherical Surface Data

| Surface No. | K | A4 | A6 | A8 | A10 | A12 |
|---|---|---|---|---|---|---|
| 20 | 0.000 | −0.1040E−05 | −0.4528E−08 | 0.5251E−12 | 0.7851E−14 | −0.1355E−16 |
| 21 | 0.000 | 0.1380E−05 | −0.4736E−08 | 0.6780E−11 | 0.9913E−15 | 0.0000E+00 |

TABLE 24

Various Data

Figure 27:
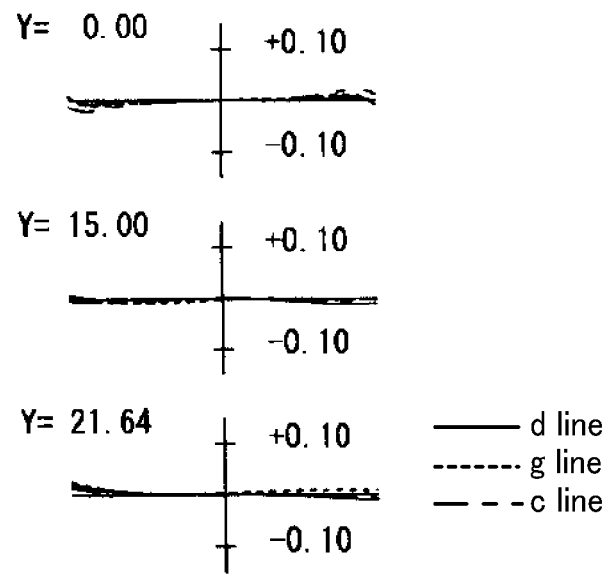
FIG. 27 includes lateral aberration diagrams of the configuration in FIG. 25.

| | |
|---|---|
| FNO. | 1.47 |
| f | 83.33 |
| W | 14.5 |
| Y | 21.64 |
| fB | 0.50 |
| L | 152.77 | diagrams of the configuration, and FIG. 27 includes lateral aberration diagrams of the configuration. Table 25 presents surface data, Table 26 presents aspherical surface data, and Table 27 presents various types of data.

The lens configuration of the imaging lens system according to Numerical Example 9 is similar to the lens configuration of the imaging lens system according to Numerical Example 3.

TABLE 25

Surface Data

| Surface No. | r | d | N(d) | ν(d) |
|---|---|---|---|---|
| 1 | −147.132 | 3.00 | 1.61340 | 44.3 |
| 2 | 233.555 | 0.92 | | |
| 3 | 113.828 | 11.14 | 1.43875 | 95.0 |
| 4 | −365.542 | 5.70 | | |
| 5 | 253.825 | 4.26 | 1.88300 | 40.8 |
| 6 | 576.783 | 0.50 | | |
| 7 | 135.660 | 7.47 | 1.43875 | 95.0 |
| 8 | −930.489 | 21.00 | | |
| 9 | 46.110 | 7.20 | 1.87070 | 40.7 |
| 10 | 91.063 | 0.30 | | |
| 11 | 37.527 | 11.24 | 1.43875 | 95.0 |
| 12 | 209.981 | 0.93 | | |
| 13 | 235.883 | 2.50 | 1.67300 | 38.3 |
| 14 | 22.600 | 8.82 | | |
| 15 (stop) | INFINITY | 4.85 | | |
| 16 | −41.129 | 1.30 | 1.67300 | 38.3 |
| 17 | 29.387 | 8.51 | 1.89190 | 37.1 |
| 18 | −76.459 | 1.42 | | |
| 19 | −49.199 | 1.30 | 1.73800 | 32.3 |
| 20 | 34.581 | 8.04 | 1.83481 | 42.7 |
| 21 | −63.740 | 0.25 | | |

TABLE 25-continued

Surface Data

| Surface No. | r | d | N(d) | ν(d) |
|---|---|---|---|---|
| 22* | 210.278 | 3.53 | 1.69350 | 53.2 |
| 23* | −132.750 | 38.05 | | |
| 24 | INFINITY | 2.00 | 1.51633 | 64.1 |
| 25 | INFINITY | — | | |

*is rotation-symmetrically aspherical surface.

TABLE 26

Aspherical Surface Data

| Surface No. | K | A4 | A6 | A8 | A10 | A12 |
|---|---|---|---|---|---|---|
| 22 | 0.000 | −0.1010E−05 | −0.7022E−08 | 0.7043E−11 | −0.5523E−14 | −0.4109E−17 |
| 23 | 0.000 | 0.1762E−05 | −0.6400E−08 | 0.1058E−10 | −0.6034E−14 | 0.0000E+00 |

Numerical Example 9

Figure 25:
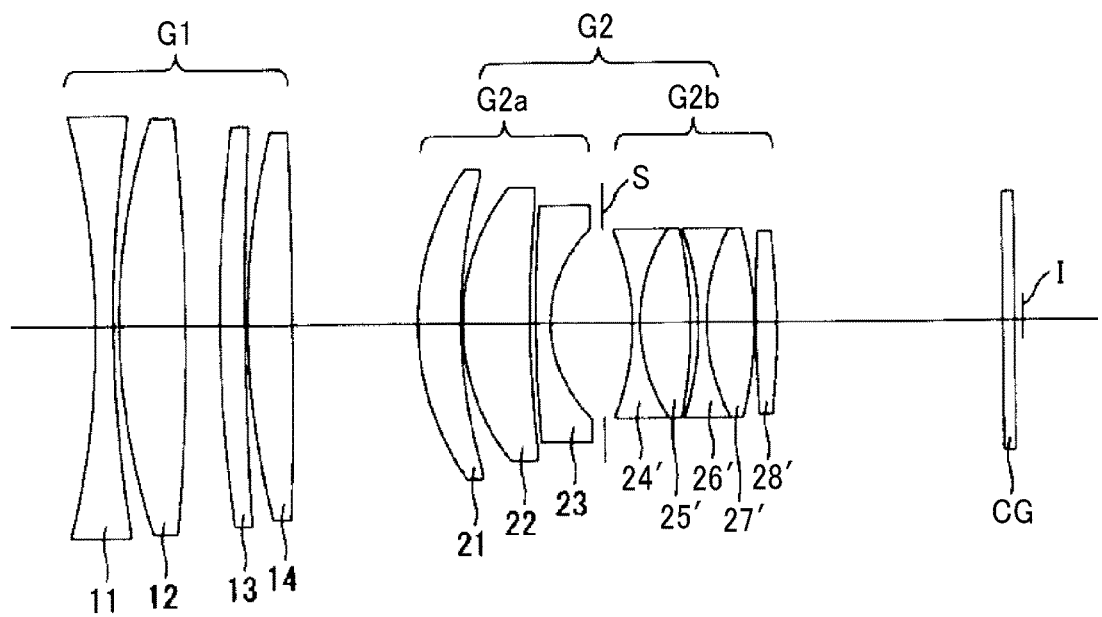
FIG. 25 is a lens configuration diagram of an imaging lens system in focus on an object at infinity according to Numerical Example 9.
Figure 26:
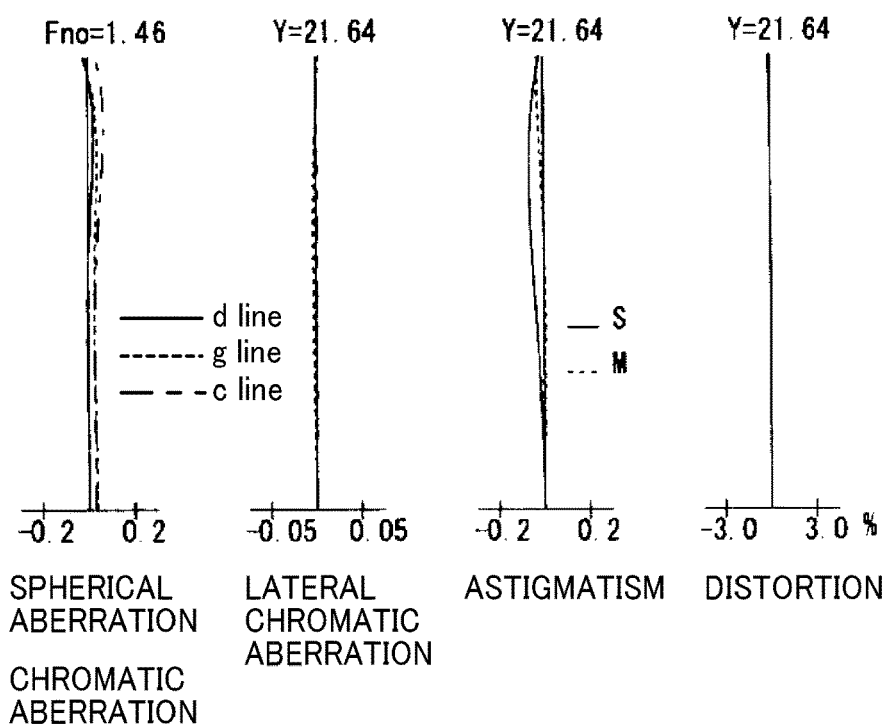
FIG. 26 includes aberration diagrams of the configuration in FIG. 25.

FIGS. 25 to 27 and Tables 25 to 27 indicate an imaging lens system (single-focus lens system) according to Numerical Example 9. FIG. 25 is a lens configuration diagram in focus on an object at infinity, FIG. 26 includes aberration

TABLE 27

Various Data

| | |
|---|---|
| FNO. | 1.46 |
| f | 83.42 |

TABLE 27-continued

Various Data

| | |
|---|---|
| W | 14.6 |
| Y | 21.64 |
| fB | 0.50 |
| L | 154.75 |

Numerical Example 10

Figure 28:
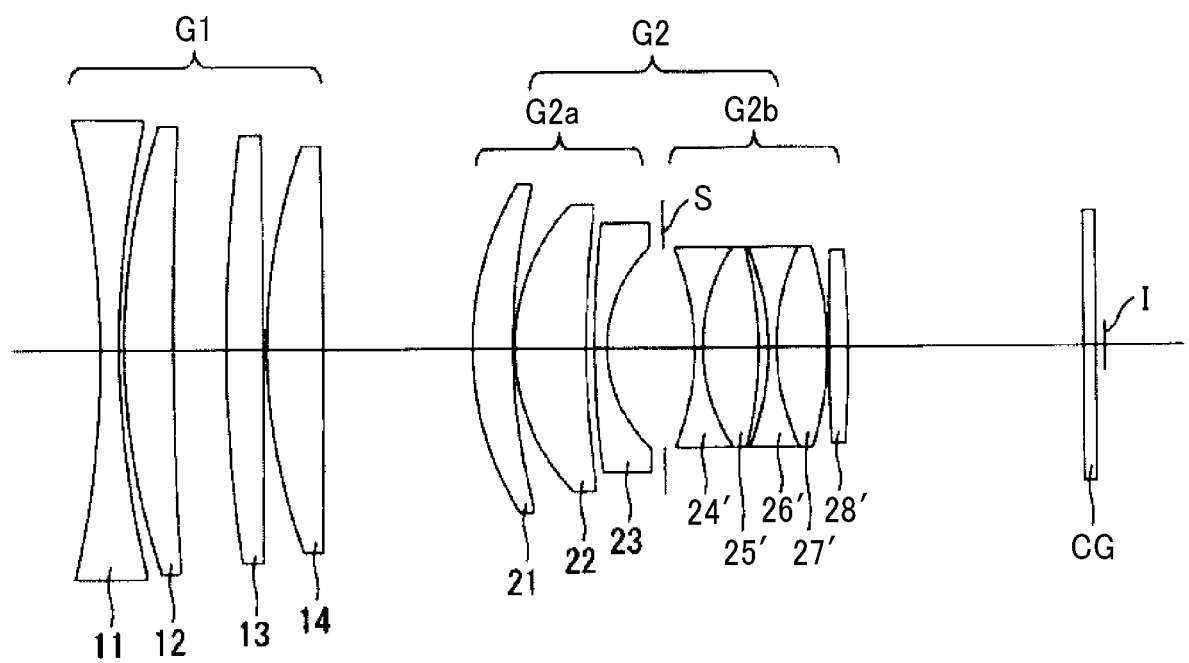
FIG. 28 is a lens configuration diagram of an imaging lens system in focus on an object at infinity according to Numerical Example 10.
Figure 29:
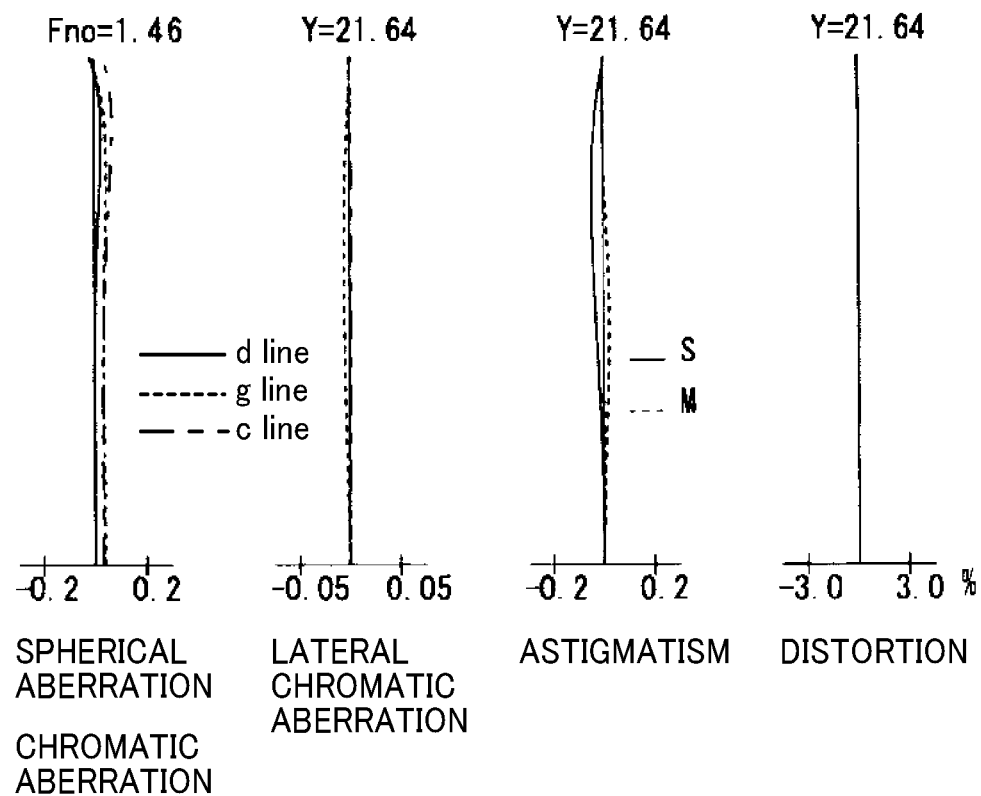
FIG. 29 includes aberration diagrams of the configuration in FIG. 28.
Figure 30:
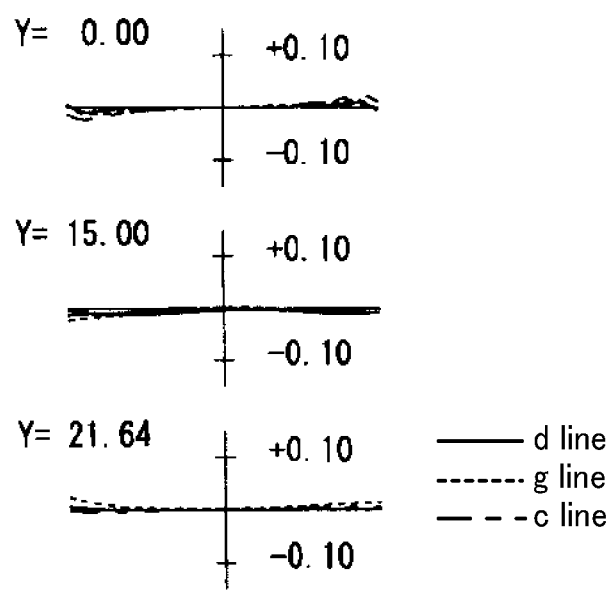
FIG. 30 includes lateral aberration diagrams of the configuration in FIG. 28.

FIGS. 28 to 30 and Tables 28 to 30 indicate an imaging lens system (single-focus lens system) according to Numerical Example 10. FIG. 28 is a lens configuration diagram in focus on an object at infinity, FIG. 29 includes aberration diagrams of the configuration, and FIG. 30 includes lateral aberration diagrams of the configuration. Table 28 presents surface data, Table 29 presents aspherical surface data, and Table 30 presents various types of data.

The lens configuration of the imaging lens system according to Numerical Example 10 is similar to the lens configuration of the imaging lens system according to Numerical Example 4 except the following point.

(A) The positive lens 13 of the first lens group G1 includes a biconvex positive lens.

TABLE 28

Surface Data

| Surface No. | r | d | N(d) | ν(d) |
|---|---|---|---|---|
| 1 | −166.238 | 3.00 | 1.51742 | 52.4 |
| 2 | 159.560 | 0.80 | | |
| 3 | 116.386 | 7.84 | 1.43875 | 95.0 |
| 4 | 669.523 | 8.39 | | |
| 5 | 248.804 | 6.00 | 1.49700 | 81.6 |
| 6 | −4044.405 | 0.50 | | |
| 7 | 96.577 | 8.97 | 1.43875 | 95.0 |
| 8 | −2303.647 | 24.01 | | |
| 9 | 50.992 | 6.40 | 1.87070 | 40.7 |
| 10 | 104.951 | 0.30 | | |
| 11 | 33.667 | 11.40 | 1.43875 | 95.0 |
| 12 | 160.210 | 1.44 | | |
| 13 | 159.314 | 2.00 | 1.67300 | 38.2 |
| 14 | 22.145 | 9.17 | | |
| 15 (stop) | INFINITY | 4.88 | | |
| 16 | −41.308 | 1.30 | 1.67300 | 38.2 |
| 17 | 29.149 | 8.95 | 1.89190 | 37.1 |
| 18 | −65.075 | 1.58 | | |
| 19 | −42.277 | 1.30 | 1.73800 | 32.3 |
| 20 | 37.625 | 8.12 | 1.83481 | 42.7 |
| 21 | −54.553 | 0.25 | | |
| 22* | 304.201 | 3.09 | 1.74320 | 49.3 |
| 23* | −192.349 | 37.97 | | |
| 24 | INFINITY | 2.00 | 1.51633 | 64.1 |
| 25 | INFINITY | — | | |

*is rotation-symmetrically aspherical surface.

TABLE 29

Aspherical Surface Data

| Surface No. | K | A4 | A6 | A8 | A10 | A12 |
|---|---|---|---|---|---|---|
| 22 | 0.000 | −0.9606E−06 | −0.5537E−08 | 0.4655E−11 | 0.5584E−14 | 0.0000E+00 |
| 23 | 0.000 | 0.1495E−05 | −0.5883E−08 | 0.1234E−10 | 0.4457E−15 | 0.0000E+00 |

TABLE 30

Various Data

| | |
|---|---|
| FNO. | 1.46 |
| f | 83.33 |
| W | 14.6 |
| Y | 21.64 |
| fB | 0.50 |
| L | 160.17 |

Numerical Example 11

Figure 31:
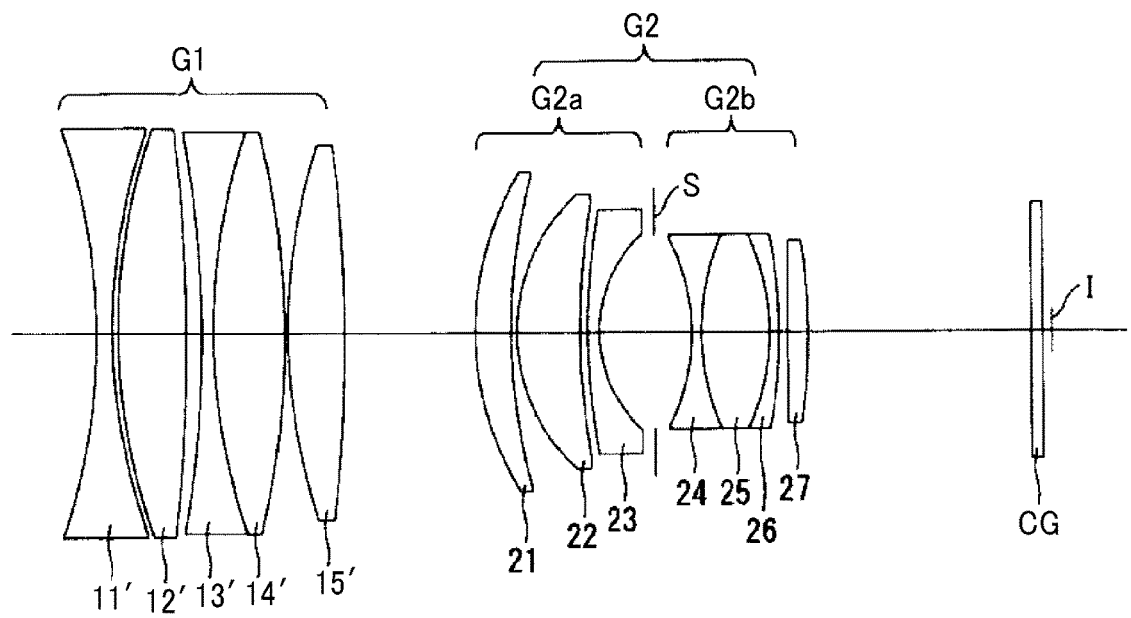
FIG. 31 is a lens configuration diagram of an imaging lens system in focus on an object at infinity according to Numerical Example 11.
Figure 32:
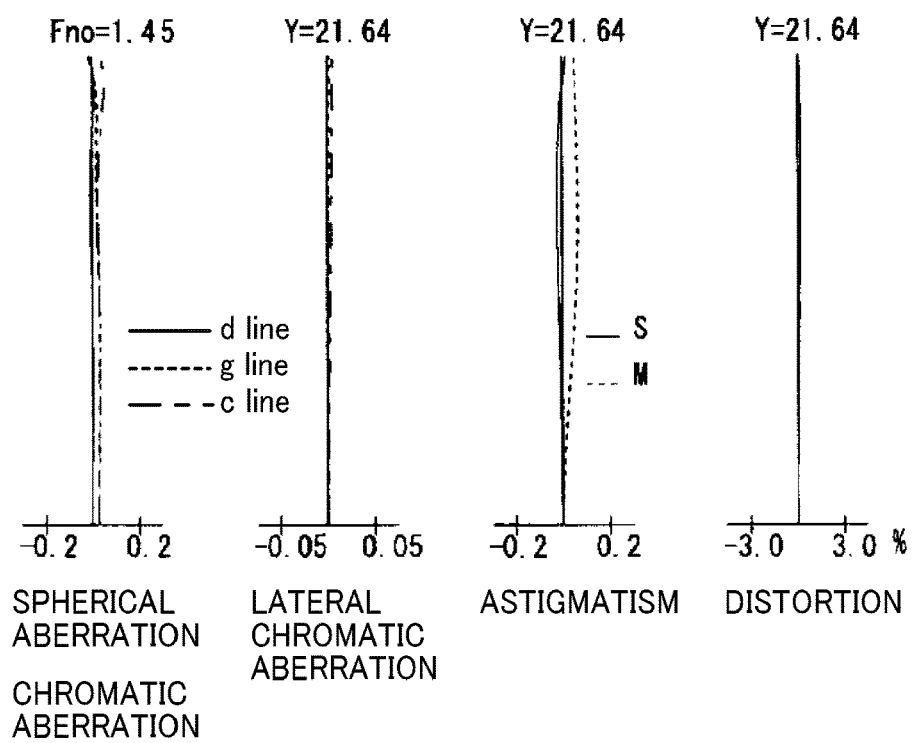
FIG. 32 includes aberration diagrams of the configuration in FIG. 31.
Figure 33:
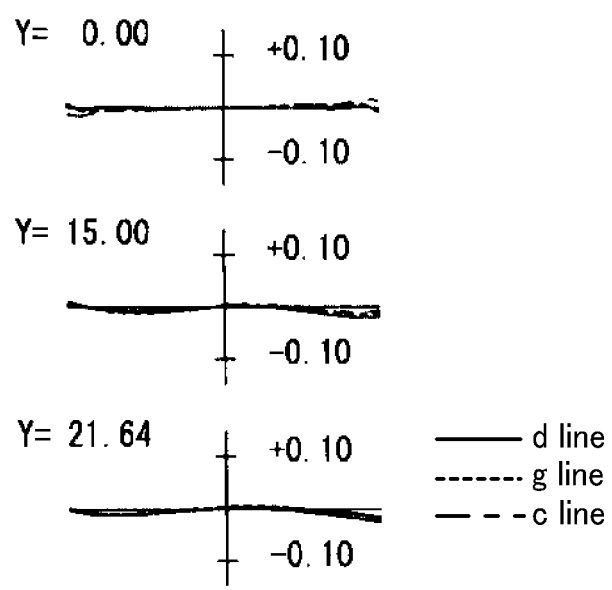
FIG. 33 includes lateral aberration diagrams of the configuration in FIG. 31.

FIGS. 31 to 33 and Tables 31 to 33 indicate an imaging lens system (single-focus lens system) according to Numerical Example 11. FIG. 31 is a lens configuration diagram in focus on an object at infinity, FIG. 32 includes aberration diagrams of the configuration, and FIG. 33 includes lateral aberration diagrams of the configuration. Table 31 presents surface data, Table 32 presents aspherical surface data, and Table 33 presents various types of data.

The lens configuration of the imaging lens system according to Numerical Example 11 is similar to the lens configuration of the imaging lens system according to Numerical Example 1 except the following point.

(A) The first lens group G1 includes, sequentially from the object side, a biconcave negative lens 11′, a biconvex positive lens 12′, a biconcave negative lens 13′, a biconvex positive lens 14′, and a biconvex positive lens 15′. The biconcave negative lens 13′ and the biconvex positive lens 14′ are cemented to each other.

TABLE 31

Surface Data

| Surface No. | r | d | N(d) | ν(d) |
|---|---|---|---|---|
| 1 | −108.304 | 2.70 | 1.61340 | 44.3 |
| 2 | 103.832 | 0.95 | | |
| 3 | 104.469 | 11.50 | 1.89190 | 37.1 |
| 4 | −320.780 | 2.70 | | |
| 5 | −190.064 | 2.00 | 1.61340 | 44.3 |
| 6 | 106.668 | 11.99 | 1.43875 | 95.0 |
| 7 | −146.964 | 0.50 | | |
| 8 | 102.493 | 9.60 | 1.43875 | 95.0 |
| 9 | −272.102 | 21.90 | | |
| 10 | 52.311 | 6.03 | 1.87070 | 40.7 |
| 11 | 100.068 | 0.98 | | |
| 12 | 31.768 | 10.68 | 1.43875 | 95.0 |
| 13 | 124.059 | 1.31 | | |
| 14 | 111.227 | 2.00 | 1.65412 | 39.7 |
| 15 | 22.490 | 9.45 | | |
| 16 (stop) | INFINITY | 6.20 | | |
| 17 | −35.054 | 1.60 | 1.64769 | 33.8 |
| 18 | 40.846 | 11.57 | 1.87070 | 40.7 |
| 19 | −39.317 | 1.60 | 1.59270 | 35.3 |
| 20 | −87.219 | 1.47 | | |
| 21* | 1412.475 | 3.41 | 1.76450 | 49.1 |
| 22* | −102.648 | 37.87 | | |

TABLE 31-continued

Surface Data

| Surface No. | r | d | N(d) | v(d) |
|---|---|---|---|---|
| 23 | INFINITY | 2.00 | 1.51633 | 64.1 |
| 24 | INFINITY | — | | |

*is rotation-symmetrically aspherical surface.

TABLE 32

Aspherical Surface Data

| Surface No. | K | A4 | A6 | A8 | A10 | A12 |
|---|---|---|---|---|---|---|
| 21 | 0.000 | −0.3453E−06 | 0.5443E−09 | −0.1265E−10 | 0.0000E+00 | 0.0000E+00 |
| 22 | 0.000 | 0.1248E−05 | −0.2408E−08 | −0.6832E−12 | −0.1549E−13 | 0.0000E+00 |

TABLE 33

Various Data

| | |
|---|---|
| FNO. | 1.45 |
| f | 82.88 |
| W | 14.6 |
| Y | 21.64 |
| fB | 0.50 |
| L | 160.53 |

Table 34 presents values for respective conditional expressions of respective numerical examples.

TABLE 34

| | Example 1 | Example 2 | Example 3 |
|---|---|---|---|
| Conditional Expression (1) | −1.24 | −1.25 | −1.45 |
| Conditional Expression (2) | 2.14 | 2.22 | 2.14 |
| Conditional Expression (3) | −0.14 | −0.17 | −0.21 |
| Conditional Expression (4) | 0.41 | 0.40 | 0.40 |
| Conditional Expression (5) | 1.06 | 1.06 | 0.82 |
| Conditional Expression (6) | 1.31 | 1.36 | 1.31 |
| Conditional Expression (7) | 1.818 | 1.806 | 1.807 |
| Conditional Expression (8) | 0.17 | 0.15 | 0.14 |

| | Example 4 | Example 5 | Example 6 | Example 7 |
|---|---|---|---|---|
| Conditional Expression (1) | −1.51 | −1.51 | −1.49 | −1.56 |
| Conditional Expression (2) | 2.33 | 2.14 | 2.04 | 2.14 |
| Conditional Expression (3) | −0.23 | −0.23 | −0.28 | −1.06 |
| Conditional Expression (4) | 0.40 | 0.39 | 0.39 | 0.34 |
| Conditional Expression (5) | 0.82 | 0.81 | 0.86 | 0.92 |
| Conditional Expression (6) | 1.33 | 1.27 | 1.25 | 1.28 |
| Conditional Expression (7) | 1.819 | 1.808 | 1.836 | 1.836 |
| Conditional Expression (8) | 0.14 | 0.14 | 0.14 | 0.14 |

| | Example 8 | Example 9 | Example 10 | Example 11 |
|---|---|---|---|---|
| Conditional Expression (1) | −1.21 | −1.76 | −1.88 | −1.04 |
| Conditional Expression (2) | 2.14 | 2.14 | 1.81 | 2.14 |
| Conditional Expression (3) | −0.11 | 0.23 | −0.02 | −0.02 |
| Conditional Expression (4) | 0.40 | 0.41 | 0.39 | 0.49 |
| Conditional Expression (5) | 1.04 | 0.49 | 0.73 | 1.01 |
| Conditional Expression (6) | 1.33 | 1.31 | 1.04 | 1.31 |
| Conditional Expression (7) | 1.818 | 1.807 | 1.823 | 1.818 |
| Conditional Expression (8) | 0.16 | 0.14 | 0.15 | 0.14 |

As found from Table 34, Numerical Examples 1 to 11 satisfy at least Conditional Expressions (1) and (2). As found from the aberration diagrams and lateral aberration diagrams, aberrations and lateral aberration are relatively properly corrected.

Even when a lens or a lens group not substantially having a power is added to an imaging lens system included in the claims of the disclosure, the addition is included in the technical scope of the disclosure (in other words, such addition does not avoid the technical scope of the disclosure).

Numerous additional modifications and variations are possible in light of the above teachings. It is therefore to be understood that, within the scope of the above teachings, the present disclosure may be practiced otherwise than as specifically described herein. With some embodiments having thus been described, it will be obvious that the same may be varied in many ways. Such variations are not to be regarded as a departure from the scope of the present disclosure and appended claims, and all such modifications are intended to be included within the scope of the present disclosure and appended claims.

The invention claimed is:

1. An imaging lens system consisting of:
   sequentially from an object side, a first lens group having a positive refractive power, and a second lens group having a positive refractive power,
   wherein the first lens group is fixed relative to an image surface and only the second lens group moves along the optical axis during focusing,
   wherein Conditional Expressions (1) and (2) are satisfied as follows:

$$-2.0 < fL1/f < -0.95, \text{ and} \tag{1}$$

$$1.7 < NdP1Gmin\_vd/L1\_vd < 2.5, \tag{2}$$

where
   fL1 is a focal length of a lens located closest to the object side of the first lens group,
   f is a focal length of a whole system,
   NdP1Gmin_vd is an Abbe number for a d-line of a positive lens having a smallest refractive index of the first lens group, and
   L1_vd is an Abbe number for the d-line of the lens located closest to the object side of the first lens group, and
   wherein Conditional Expression (3) is satisfied as follows:

$$-1.5 < (L1R2+L1R1)/(L1R2-L1R1) < 0.5, \tag{3}$$

where
   L1R1 is a curvature radius of a surface on the object side of the lens located closest to the object side of the first lens group, and
   L1R2 is a curvature radius of a surface on an image side of the lens located closest to the object side of the first lens group.

2. The imaging lens system according to claim 1,
   wherein the first lens group includes a negative lens located closest to the object side, and
   wherein Conditional Expression (5) is satisfied as follows:

$$0.01 < LnR2/LpR1 < 1.2, \tag{5}$$

where

LnR2 is a curvature radius of a surface on an image side of the negative lens located closest to the object side of the first lens group, and LpR1 is a curvature radius of a surface on the object side of a lens located in immediately rear of the negative lens located closest to the object side of the first lens group.

3. The imaging lens system according to claim 1, wherein the first lens group includes one of a subgroup including four lenses including, sequentially from the object side, a negative lens, a positive lens, a positive lens, and a positive lens, and a subgroup including five lenses including, sequentially from the object side, a negative lens, a positive lens, a negative lens, a positive lens, and a positive lens.

4. The imaging lens system according to claim 1, wherein Conditional Expression (6) is satisfied as follows:

$$1.25<Nd\_1GpP\text{max}/Nd\_1GpP\text{min}, \quad (6)$$

where

Nd_1GpPmax is a refractive index of a positive lens having a largest refractive index of the first lens group, and Nd_1GpPmin is a refractive index of a positive lens having a smallest refractive index of the first lens group.

5. The imaging lens system according to claim 1, wherein Conditional Expression (8) is satisfied as follows:

$$0.13<DG1-G2/TL<0.18, \quad (8)$$

where

DG1-G2 is a distance between a surface located closest to an image side of the first lens group and a surface located closest to the object side of the second lens group, and TL is a distance between a surface located closest to the object side of the first lens group and an image surface.

6. The imaging lens system according to claim 1, wherein the first lens group and the second lens group move toward the object side by different moving amounts during focusing.

7. The imaging lens system according to claim 1, wherein the first lens group moves toward an image side and the second lens group moves toward the object side during focusing.

8. The imaging lens system according to claim 1, wherein the second lens group includes an image-blur correction lens group configured to move in a direction containing a component orthogonal to an optical axis and displace an imaging position to correct an image blur.

9. An imaging lens system consisting of:

sequentially from an object side, a first lens group having a positive refractive power, and a second lens group having a positive refractive power, wherein the first lens group is fixed relative to an image surface and only the second lens group moves along the optical axis during focusing, wherein Conditional Expressions (1) and (2) are satisfied as follows:

$$-2.0<fL1/f<-0.95, \text{ and} \quad (1)$$

$$1.7<NdP1G\text{min}\_vd/L1\_vd<2.5, \quad (2)$$

where fL1 is a focal length of a lens located closest to the object side of the first lens group, f is a focal length of a whole system, NdP1Gmin_vd is an Abbe number for a d-line of a positive lens having a smallest refractive index of the first lens group, and L1_vd is an Abbe number for the d-line of the lens located closest to the object side of the first lens group, and wherein Conditional Expression (4) is satisfied as follows:

$$0.32<f2Gp/f1Gp<0.50, \quad (4)$$

where f1Gp is a focal length of the first lens group, and f2Gp is a focal length of the second lens group.

10. The imaging lens system according to claim 9, wherein the first lens group and the second lens group move toward the object side by different moving amounts during focusing.

11. The imaging lens system according to claim 9, wherein the first lens group moves toward an image side and the second lens group moves toward the object side during focusing.

12. An imaging lens system consisting of:

sequentially from an object side, a first lens group having a positive refractive power, and a second lens group having a positive refractive power, wherein the first lens group is fixed relative to an image surface and only the second lens group moves along the optical axis during focusing, wherein Conditional Expressions (1) and (2) are satisfied as follows:

$$-2.0<fL1/f<-0.95, \text{ and} \quad (1)$$

$$1.7<NdP1G\text{min}\_vd/L1\_vd<2.5, \quad (2)$$

where fL1 is a focal length of a lens located closest to the object side of the first lens group, f is a focal length of a whole system, NdP1Gmin_vd is an Abbe number for a d-line of a positive lens having a smallest refractive index of the first lens group, and L1_vd is an Abbe number for the d-line of the lens located closest to the object side of the first lens group, and wherein the first lens group includes:

a negative lens located closest to the object side and having a concave surface facing the object side; and at least three positive lenses located closer than the negative lens to an image side.

13. The imaging lens system according to claim 9, wherein the first lens group and the second lens group move toward the object side by different moving amounts during focusing.

14. The imaging lens system according to claim 12, wherein the first lens group moves toward an image side and the second lens group moves toward the object side during focusing.

15. An imaging lens system consisting of:

sequentially from an object side, a first lens group having a positive refractive power, and a second lens group having a positive refractive power, wherein the first lens group is fixed relative to an image surface and only the second lens group moves along the optical axis during focusing, wherein Conditional Expressions (1) and (2) are satisfied as follows:

$$-2.0<fL1/f<-0.95, \text{ and} \quad (1)$$

$$1.7<NdP1G\text{min}\_vd/L1\_vd<2.5, \quad (2)$$

where fL1 is a focal length of a lens located closest to the object side of the first lens group, f is a focal length of a whole system, NdP1Gmin_vd is an Abbe number for a d-line of a positive lens having a smallest refractive index of the first lens group, and L1_vd is an Abbe number for the d-line of the lens located closest to the object side of the first lens group,
  wherein the second lens group includes, sequentially from the object side, a second-a lens subgroup having a positive refractive power, an aperture stop, and a second-b lens subgroup having a positive refractive power,
  wherein a lens surface located closest to an image side of the second-a lens subgroup has a concave surface facing the image side, and
  wherein a lens surface located closest to the object side of the second-b lens subgroup has a concave surface facing the object side.

16. The imaging lens system according to claim 15, wherein Conditional Expression (7) is satisfied as follows:

$$1.80 < Nd\_2BGpPave, \quad (7)$$

where

Nd_2BGpPave is an average value of refractive indices of a plurality of positive lenses of the second-b lens subgroup.

17. The imaging lens system according to claim 15, wherein the second-b lens subgroup has at least one aspherical surface.

18. The imaging lens system according to claim 15,
  wherein the second-a lens subgroup includes three lenses including, sequentially from the object side, a positive lens, a positive lens, and a negative lens, and
  wherein the second-b lens subgroup includes one of a subgroup including four lenses including, sequentially from the object side, a negative lens, a positive lens, a negative lens, and a positive lens, and a subgroup including five lenses including, sequentially from the object side, a negative lens, a positive lens, a negative lens, a positive lens, and a positive lens.

19. The imaging lens system according to claim 15, wherein the first lens group and the second lens group move toward the object side by different moving amounts during focusing.

20. The imaging lens system according to claim 15, wherein the first lens group moves toward an image side and the second lens group moves toward the object side during focusing.

* * * * *